United States Patent [19]
Bogel

[11] 3,878,436
[45] Apr. 15, 1975

[54] ELECTRICAL CIRCUIT RECLOSER WITH STATIC CONTROL

[75] Inventor: George F. Bogel, Pittsburgh, Pa.

[73] Assignee: Westinghouse Electric Corporation, Pittsburgh, Pa.

[22] Filed: Nov. 20, 1973

[21] Appl. No.: 417,694

[52] U.S. Cl. ........................... 317/22; 323/8
[51] Int. Cl. .............................. H02h 3/08
[58] Field of Search ............... 317/22, 23; 323/8

[56] References Cited
UNITED STATES PATENTS

| | | | |
|---|---|---|---|
| 3,440,491 | 4/1969 | Tenenbaum et al. | 317/22 |
| 3,567,997 | 3/1971 | Moran | 317/22 |
| 3,689,887 | 9/1972 | Lafalce et al. | 317/22 X |

*Primary Examiner*—James D. Trammell
*Attorney, Agent, or Firm*—M. J. Moran

[57] ABSTRACT

A circuit interrupter having a control system comprising solid state circuit components including integrated circuits. The control system is programmable to provide multiple predetermined functions such as: time delay before circuit interrupter opening during a duty cycle, time delay before circuit interrupter closing during a duty cycle, time delay before a control system reset after fault clearing and control of the number of trips to lockout for the circuit recloser. No mechanical relays are used in the control system circuit except the auxiliary contacts of the circuit interrupter. A binary counter and decoder are used for counting the number of subsequent closings and openings of the circuit interrupter during a duty cycle and for advancing the various functions of the control system in accordance with programmed settings. The trip coil for the circuit interrupter may be energized for opening the circuit breaker up to one-half hour after power has been removed from the control system. A power supply is provided which may be energized from the electrical lines being protected or from a separate independent source of power. In the former case, the power supply is adapted to continuously energize the control system even though a short circuit fault may appear across the electrical lines which provide energy to the power supply. The power supply is also adapted to be used in combination with potential transformers and the current sensors of the system for regulating or clamping the input signal which is provided to the control system if the fault which is monitored by the sensor reaches a predetermined value.

3 Claims, 11 Drawing Figures

ELECTRICAL CIRCUIT RECLOSER WITH STATIC CONTROL

BACKGROUND OF THE INVENTION

1. Field of the Invention

This invention relates to electrical circuit reclosers in general and in particularly it relates to electrical circuit reclosers including static control systems.

2. Description of the Prior Art

Electric circuit reclosers are circuit breakers the tripping and closing means of which are connected to an electrical control system which is in turn supplied with information concerning the status of the line being protected by the circuit interrupter. In response to the status of the line being protected, the circuit recloser will begin a duty cycle which may include a number of successive openings and closing any or all of which may be delayed. Control systems of this type are shown in U.S. Pat. Nos. 3,167,686; 3,295,017; and 3,351,814 issued to R. E. Riebes or R. E. Riebes et al as the case may be. The systems described in these patents use a hydraulic counter and mechanical relay. The hydraulic counter is useful in keeping count of the number of openings and closings the circuit interrupter has completed during a duty cycle. However, mechanical relays and hydraulic counters present problems in the operation of a recloser system. The hydraulic counter is relatively slow to act compared with the electronic components which comprise other portions of the control system, are susceptible to hydraulic fluid leakage and to mechanical wear. The mechanical relays and relay contacts are also slow in acting compared to the electrical circuitry, are susceptible to mechanical wear and are easily influenced by environmental conditions, such as the presence of dust. Circuit interrupters are described in three patents assigned to the assignee of the present invention: U.S. Pat. Nos. 3,317,791 issued to R. W. Price et al, 3,389,303 issued to N. D. Tenenbaum, and 3,440,491 issued to N. D. Tenenbaum et al. In these patents a mechanical stepping switch is provided as a counter and reference is made to the use of an indexing device or stepping switch which may be static. However, no specific embodiment or description of a static indexing means or stepping switch is described or disclosed in those patent applications. In U.S. Pat. No. 3,560,798 by N. D. Tenenbaum which is also assigned to the assignee of the present invention an antipumping circuit is provided for use with two circuit reclosers which are connected in circuit orientation to connect either or both of two supply buses to a single power line. There is not disclosed in this patent an indexing device or stepping means. It would be advantageous if a circuit recloser and control system therefor were available in which the control system was substantially entirely solid state and which further utilized integrated circuitry and computer oriented systems. It would also be advantageous to provide a circuit interrupter capable of being tripped to a fail-safe condition after the power for the control system has been removed either inadvertently or otherwise. It would also be advantageous to provide a control system which would remain operational in all its aspects even if the power supply input was shorted out, such as might be the case if the power supply input were connected to the line to be protected and a fault or short circuit developed across that line. And it would be also advantageous if the recloser control system had a regulating means in the input or sensor portion thereof so that large excursions in current such as might occur when the current changes from full rated current to short circuit current, would not produce input signals for the control circuit which would tend to damage portions of the control circuit.

SUMMARY OF THE INVENTION

In accordance with the invention, a circuit relcoser is provided with a control system employing substantially entirely static elements. A binary counter is provided for keeping account of the number of successive openings and reclosing of the circuit interrupter during the duty cycle. The binary count from the binary counter is decoder by a solid state decoder. The binary counter comprises integrated circuits connected in computer orientation, that is the integrated circuits are oriented as a bistable multi-vibrator circuit interconnected with NAND GATES. The decoder comprises a NAND GATE connected in a computer orientation to index various functional elements of the circuit. A power supply means is provided which may be connected to the lines being protected by the circuit recloser or which may be connected to a separate source of power. The power supply means is electrically connected to the input current transformers and through the auxiliary windings of potential transformers connected thereto. In the event a fault appears across the line to be protected so that the voltage across the input terminals of the power supply is significantly reduced, sufficient current from the sensing current transformers is reflected through the auxiliary winding of the potential transformer to supply auxiliary voltage to the power supplied to thereby maintain operational voltage level for the various elements of the control circuit. In addition, should the short circuit in the line to be protected reach an extremely high value, the auxiliary potential windings act to regulate the voltage on the input terminals of the recloser control system so that it is clamped to a safe operating value for the various components of the recloser control system. In the present invention up to four trips or openings of the circuit breaker in response to a fault on the line to be protected may occur before the control system causes the circuit interrupter to lockout or end its duty cycle. The tripping or opening of the circuit breaker in response to a fault on the line may occur substantially instantaneously after the fault is sensed or may occur at a short time after the fault is sensed according to a predetermined delay program. The delay program may be implemented by placing multiple position switches in various orientations on a control console. In a like manner, the reclose time or the time it takes the circuit breaker to reclose again on a line after a previous opening may be accomplished substantially instantaneously after the opening of the circuit breaker or after a short time delay which may be up to 60 seconds in some instances. A different reclose time may be provided by a reclosed program which may be preset by adjusting multiple position multiple deck switches. The power recloser static control is provided with a reset programmer which may be preset at values up to 60 seconds. The reset time is that time after the reclosing of the circuit breaker on a cleared line that the power recloser static control is reset to its initial status for initiation of the duty cycle upon the sensing of a new fault on the line to be protected. The recloser static control includes means for defeating the previously described duty cycle of the recloser to provide a one shot to lockout operation of the circuit recloser in which case the circuit breaker will remain open after sensing a fault on the line which it protects without entering into the previously described duty cycle. The circuit breaker will remain open until closed manually or electrically by way of a switch on the power recloser static control. The previously described switch can be used to trip or close the circuit breaker an any time and overrides the automatic operation of the power recloser static control. The disclosed invention contains no mechanical or hydraulic indexing means or stepping switches. All indexing, sensing and relaying except for those relaying associated with the auxiliary contacts of the circuit interrupter are performed with static circuit elements according to preplanned or preset programs. Programming or adjustments of the positions of programming switches can be done on one console.

BRIEF DESCRIPTION OF THE DRAWINGS

For a better understanding of the invention, reference may be had to the preferred embodiment exemplary of the invention shown in the accompanying drawings in which.

Figure 1:
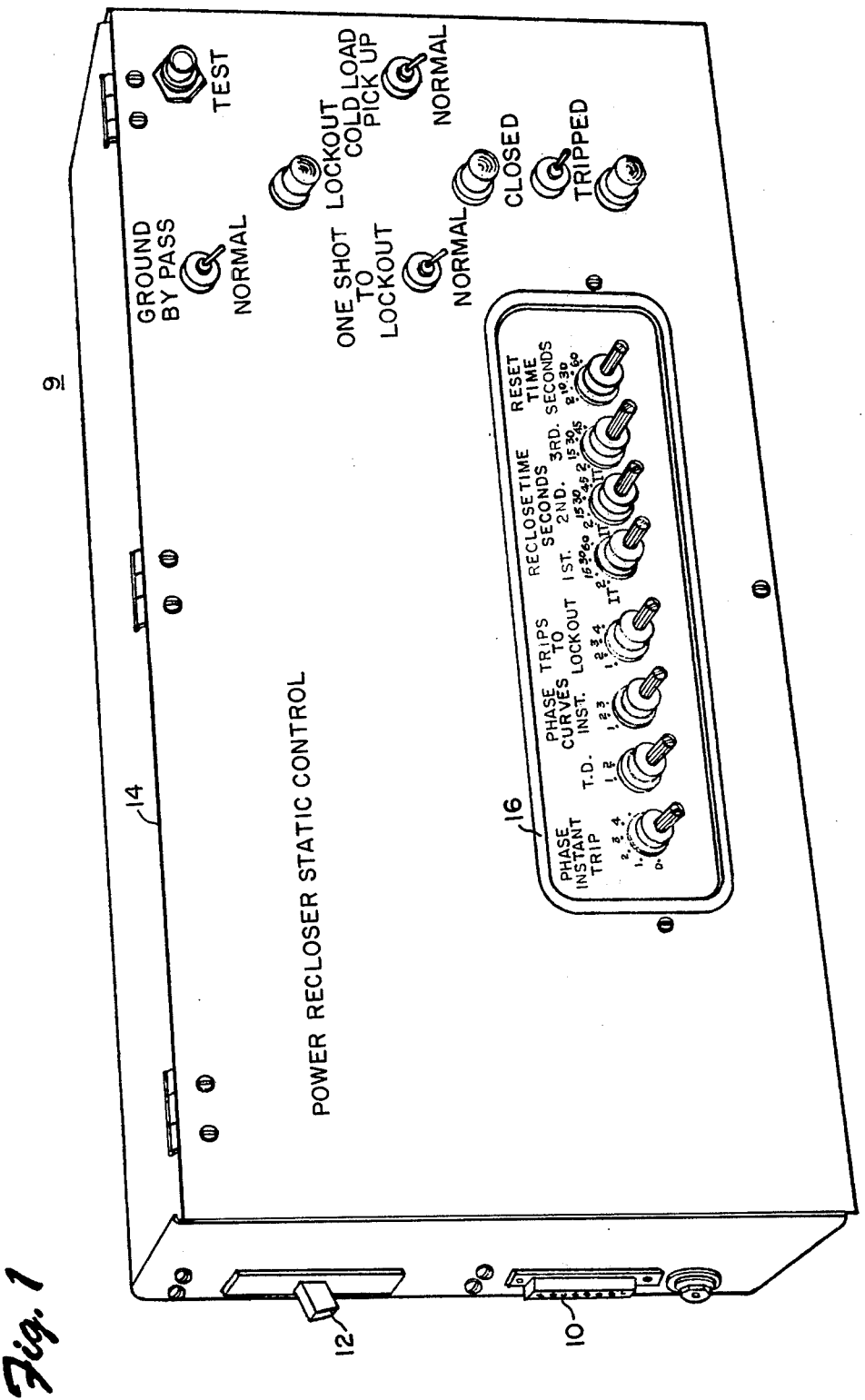
FIG. 1 is an orthogonal view of the power recloser static control console.

Referring now to the drawings and FIG. 1 in particular, a power recloser static control 9 is shown. Power recloser static control 9 is adapted for use in a recloser system where a separate circuit interrupter or circuit breaker (now shown) may be controlled by the power recloser static control 9 for protecting electrical circuits which may be connected to the separable main contacts of the circuit interrupter or circuit breaker. Connector 10 on the left side of the power recloser static control 9 is adapted to be connected to a complementary connector from the circuit breaker or circuit interrupter and all of the control signals for the circuit interrupter or circuit breaker may come from the power recloser static control through the contacts or terminals in connector 10. A main power switch circuit breaker or fuse 12 is also shown on the left side of the power recloser static control and is utilized for controlling the energy which is provided to the power recloser static control for energizing it or turning it on. Current sensors, such as CT1, CT2, and CT3 as shown in FIG. 3 are connected to the power recloser static control 9 through connector 10 also. In the specific embodiment of the invention the front panel 14 of the power recloser static control console 9 is hinged at the top for convenient accessibility to the circuitry of the power recloser static control contained within the console 9. Front panel 14 has an opening 16 through which programmable control switches for the power recloser static control 9 protrude. The settings of the control switches in most cases may be variable in discrete step between different values for the control of parameters within the power recloser static control circuitry. It is to be understood that in some instances the switches may be variable continuously in other embodiments of the invention. The fourth switch from the left is entitled "TRIP TO LOCKOUT" this switch may be varied discretely between four positions identified as 1, 2, 3 and 4. Placement of this switch at any of the four positions will determine how many times the circuit interrupter or circuit breaker controlled by the recloser system will open or trip in the presence of a fault with intermediate reclosing. Consequently, if the TRIP TO LOCKOUT switch is set in the fourth position when a fault occurs, the circuit interrupter will be opened initially in response to the sensing of the fault and then three successive times thereafter with intermediate closings therebetween if the fault persists. After the fourth trip or opening of the circuit breaker, the control system would lockout or prevent the circuit breaker from subsequently reclosing automatically whether the fault remains or disappears. The circuit breaker or circuit interrupter must then be closed either by mechanically closing the circuit breaker, separable main contacts at the circuit breaker cabinet or by electrically closing the separable main contacts by manually actuating a switch for that purpose. In this embodiment of the invention a switch is provided on the console for manually electrically opening or closing the separable main contacts of the circuit breaker regardless of the status of the automatic features of the power recloser static control. In another example, the trips to lockout switch may be placed in the second position. According to this program, the circuit breaker will open upon the sensing of a fault, reclose once and open again if the fault is still present. Thereafter the circuit breaker will remain open regardless of the fault status of the line to be protected until the circuit breaker is manually closed as previously discussed. The TRIPS TO LOCKOUT switch therefore controls the number of successive openings and closings of the circuit breaker controlled by the static controller 9.

The controller 9 has the capability of causing the circuit breaker or circuit interrupter to open almost instantaneously or with a very short time delay after the sensing of a fault on the line br protected either initially or after a previous reclosing. The PHASE INSTANT TRIP switch which is the first switch on the left in cutout 16 may be preset in the specific embodiment of the invention to any number from 0 to 4. Regardless of the setting of the PHASE INSTANT TRIP switch or programming device it is not possible to have more phase instant then the number of the setting of the trips to lockout switch. As an example, if the trips to lockout switch is indexed to the 3 position, the phase instant trip switch may be set at any position from 0 to 3 and it will therefore cause three nearly instantaneous openings of the circuit breaker after a fault is sensed with intermediate reclosings. If the PHASE INSTANT TRIP switch were set to 4, the controlling aspects of the TRIPS TO LOCKOUT switch would nevertheless prevent any but three nearly instantaneous trips. As a further example, if the TRIPS TO LOCKOUT switch were set at 2, any setting on the PHASE INSTANT TRIP switch beyond 2 would be without effect. If the PHASE INSTANT TRIP program switch is set to a lower number than the setting of the TRIPS TO LOCKOUT SWITCH, then the circuit breaker being controlled by the power recloser static control will open nearly instantaneously a number of times equal to the setting of the PHASE INSTANT TRIP switch and thereafter the circuit breaker will open with a time delay if the fault remains on the circuit to be protected after the previous reclosing. Time delayed openings after previous reclosings will continue until the total number of programmed phase instant trips plus time delayed trips equals the setting on the TRIPS TO LOCKOUT switch. By way of illustration and to aid the reader in understanding the cooperation between the static circuitry controlled by the TRIPS TO LOCKOUT switch, the static circuitry controlled by the PHASE INSTANT TRIP switch and the static circuitry which controls the time delayed trips, the following example is presented: The TRIPS TO LOCKOUT switch is set at 3 which means that it is desired to have no more than three successive openings of the circuit breaker controlled by the power recloser static control system after a fault has been sensed on the line to be protected by the circuit breaker if the fault does not clear during the three successive openings of the circuit breaker during the duty cycle thereof. The PHASE INSTANT TRIP switch is set at 2 which means that it is desired that the first two openings of the circuit breaker be accomplished relatively quickly or said in another way be done almost instantaneously. Such being the case, the third reopening of the circuit breaker will be by necessary implication be delayed for a predetermined period of time the length of which will be determined in a manner to be described hereafter. The previous example was merely for illustration and is not to be considered limiting in any way. Other programmable combinations may be used among the circuit elements and switches previously described.

The third switch from the left in the insert 16 is entitled "THE PHASE CURVE INST." This switch provides the setting or means for programming the nearly instantaneous delay after the sensing of a fault on a closed circuit breaker, after which the circuit breaker will be caused by the power recloser static control system to open or reopen as the case may be. It is possible in this embodiment of the invention to choose among any three characteristic overload current versus time delayed characteristics for the previously described nearly instantaneous tripping operations in the duty cycle of the circuit breaker. It should be understood that the instantaneous trips or instantaneous tripping characteristics previously described are in fact not instantaneous but delayed by a relatively short period of time compared with the time delayed tripping characteristic. The time delayed tripping characteristics may be measured in seconds or minutes but the instantaneous tripping characteristics may be measured in milliseconds or seconds. In all cases the timing characteristic may be a function of the amount of overload current being sensed by the sensors of the control system. Between the PHASE INSTANT TRIP switch and the PHASE CURVES INST. switch of the power recloser static control is a switch control designated T.D. This is known as the time delayed program switch and is useful for presetting any one of a plurality of time dealys which are related to the amount of overload current and which are chosen to cause time delays for tripping of relatively long periods when compared to the previously described instantaneous time delays. In this embodiment of the invention two possible time delays are programmable by indexing or moving the T.D. switch between positions 1 and positions 2. It can be seen then that in this particular embodiment of the invention anyone of three different short time delays may be chosen for generally instantaneous tripping in the duty cycle and anyone of two relatively long time delayed trips may chosen for delayed tripping. The latter time delayed characteristics are achieved by providing a generally static circuit card comprising interconnected resistors, capacitors, Zener diodes and diodes in general diode matrix form which cooperate with an input capacitor and the previously described PHASE CURVES INST. and T.D. switches to accomplish the results as previously described. A circuit of this kind is described in U.S. Pat. No. 3,544,846 by F. T. Thompson and assigned to the assignee of the present application.

By way of illustration, the power recloser static control may be programmed to provide a relatively short time delayed opening of the circuit breaker for each of the phase instant trips during the duty cycle as determined by the setting of the PHASE INSTANT TRIP switch. In a similar manner anyone of two relatively longer time delayed openings of the circuit breaker may be provided for the predetermined number of time delayed openings of the circuit breaker as determined by the difference in setting between the TRIPS TO LOCKOUT switch and the PHASE INSTANT TRIP switch. In regards to the previously described operating characteristic of the recloser all of the previous preset or programmed automatic operations may be defeated at anytime by using the ONE SHOT TO LOCKOUT switch shown on the right side of panel 14. In the up or LOCKOUT position the circuit interrupter or circuit breaker is caused to open only one time upon the sensing of a fault according to the time delayed characteristic set on the PHASE CURVES INST. switch. Thereafter the circuit breaker will not reclose upon the fault but will remain open until manually closed in a manner previously described.

In addition to the previously described preset program for causing the opening or reopening of a circuit interrupter or circuit breaker during a duty cycle the reclosing of the circuit breaker during the duty cycle may also be controlled according to preset or programmed characteristics as determined by the three switches or programming means identified as RECLOSE TIME SECONDS, FIRST, SECOND, THIRD. Since the maximum number of trips to lockout is 4, it follows that the subsequent maximum number of circuit breaker reclosings is 3. In the embodiment of the invention shown in FIG. 1, each of the reclosing operations may occur after the previous opening of the circuit breaker according to a predetermined time delay which may be set for each of the maximum of three reclosings. The latitude of programming for the reclosing of the circuit breaker is sufficient to allow each of the reclosing operations to be delayed by a different time if that is desirable. Five possible time delayed values are available fro each reclosing time delay up to a maximum of 3 times delayed reclosings. In each case the selector switch may be set to instantaneous "IT", 2 seconds, 15 seconds, 30 seconds, or 45 seconds time delay between the opening of the circuit breaker and the subsequent reclosing. This allows time after each opening in the duty cycle to allow the fault to clear itself before an attempt is made to reclose the circuit breaker on a line or conductor which was initially faulted. By way of illustration and presuming that the TRIPS TO LOCKOUT switch has been set to 4 which means up to four successive trips, with intermediate reclosings, can occur if a fault persists on the line to be protected. The three reclosing time delays can be perset thusly. The first time delay may be instantaneous as represented by the symbol IT in the first index position of the first RECLOSE TIME switch. The second time delay may be set at 2 seconds and the third time delay may be set at 45 seconds. This means that after the initial opening of the circuit breaker in response to the sensing of a fault on the line which the circuit breaker protects, the circuit breaker will substantially instantaneously reclose. If the fault persists and the circuit breaker opens again, the second relcosing will be delayed after the last opening thereof by a period of two seconds. If the fault continues to persist and the circuit breaker opens once again, the subsequent reclosing will be delayed by 45 seconds. If after that the circuit breaker opens again, the maximum programmed number of trips to lockout of 4 will have occurred and the circuit breaker will remain open regardless of the state of the line thereafter until it is manually closed in a manner previously described.

The last selector switch to the right in the cutout 16 of panel 14 is designated RESET TIME SECONDS. In this embodiment of the invention, there are four possible preset positions for the RESET TIME switch. Reset is defined as the action after the time after the completion of a duty cycle as previously described whereby the controller provides a signal to certain critical circuit elements causing those circuit elements to revert to a state which will allow the circuit breaker control system to begin a duty cycle anew should a fault occur. In this particular embodiment of the invention, the reset time may be set at 2 seconds, 10 seconds, 30 seconds and 60 seconds. By way of illustration, the reset time selector switch may be set at 2 seconds. In which case if the circuit recloser system has completed a duty cycle to the extent that the fault which would initially trigger the beginning of another duty cycle of the circuit breaker has disappeared before lockout, and no subsequent reopening of the circuit breaker contacts is required, the counter of the controller will be reset so that if a fault appears again on the line to be protected at any time after two seconds after the last reclosing on a nonfaulty line, the duty cycle wil begin anew.

On the right portion of panel 14 a three position toggle switch is provided which is vertically located between two lamps indicated by the legend CLOSED and TRIPPED. This switch is the previously described remote electrical switch for opening or closing the circuit breaker and overriding any of the previously described functions. By way of illustration, if the switch is depressed to the TRIPPED position, regardless of the state of the line to be protected or state of the duty cycle of the recloser, the recloser will trip or open and remain tripped or open until closed either mechanically as previously described or electrically by placing the toggle switch in the CLOSED position. Also included in the right portion of panel 14 is a switch designated COLDLOAD PICKUP which is a single pole double throw switch which may be moved from the NORMAL positions of the PICKUP position or vice versa. This switch decreases the sensitivity of the "minimum trip circuit" the function of which will be described later. A TEST pushbutton is the also present on the right portion of panel 14. The TEST pushbutton may be utilized to test the power supply capability and capacity of the circuit breaker trip circuit which will be described in greater detail thereafter. Depressing of the TEST pushbutton will cause a tripping of the circuit breaker after which automatic reclosing takes palce or manual reclosing can be utilized. Also on the right portion of panel 14 is a switch generally designated GROUND BYPASS which may be switchable to the BYPASS position and the NORMAL position. This switch has no relationship to the invention described herein and is useful for other purposes.

Figure 2:
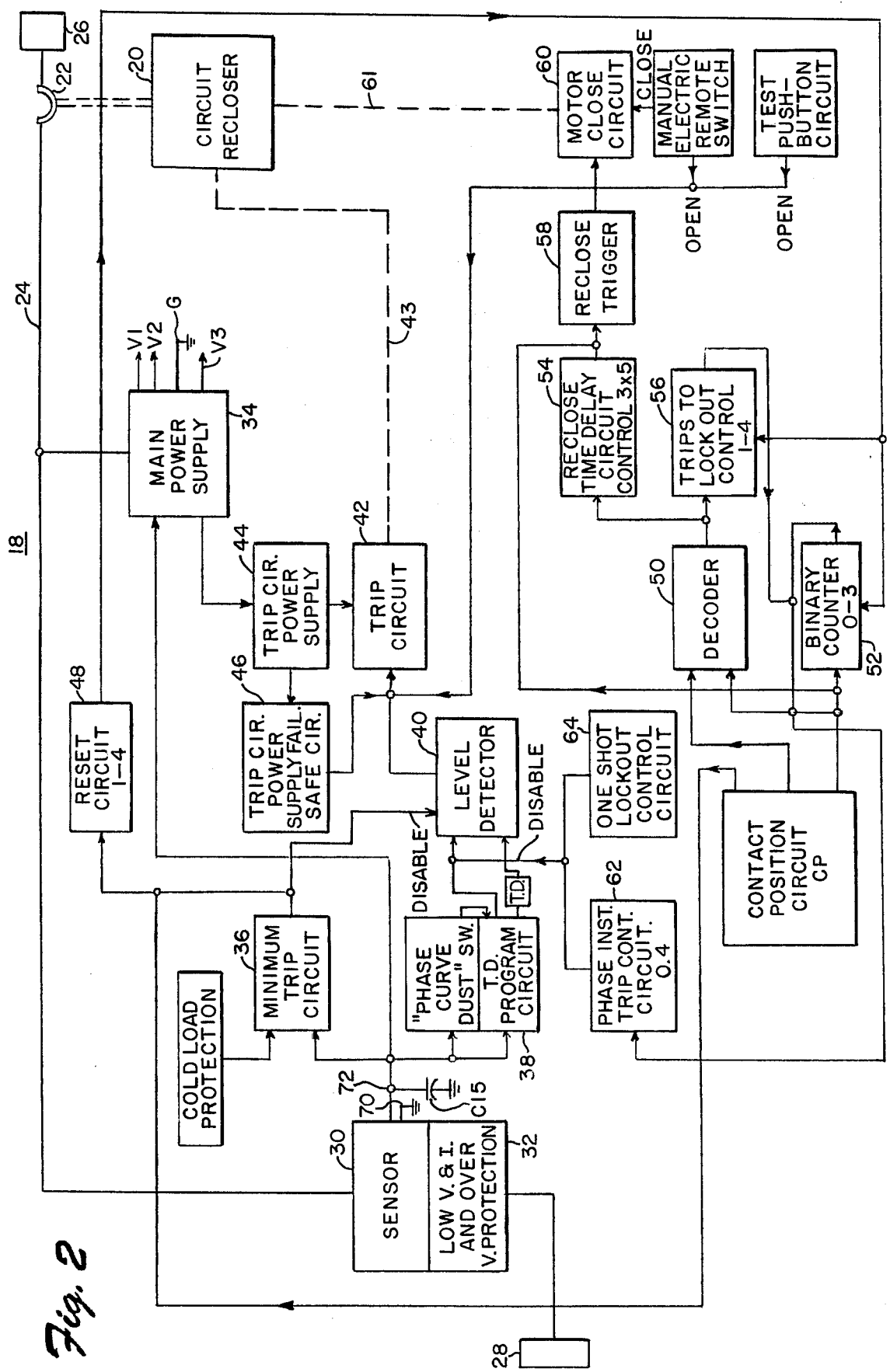
FIG. 2 is a functional block diagram of the recloser and its control system.
Figure 3A:
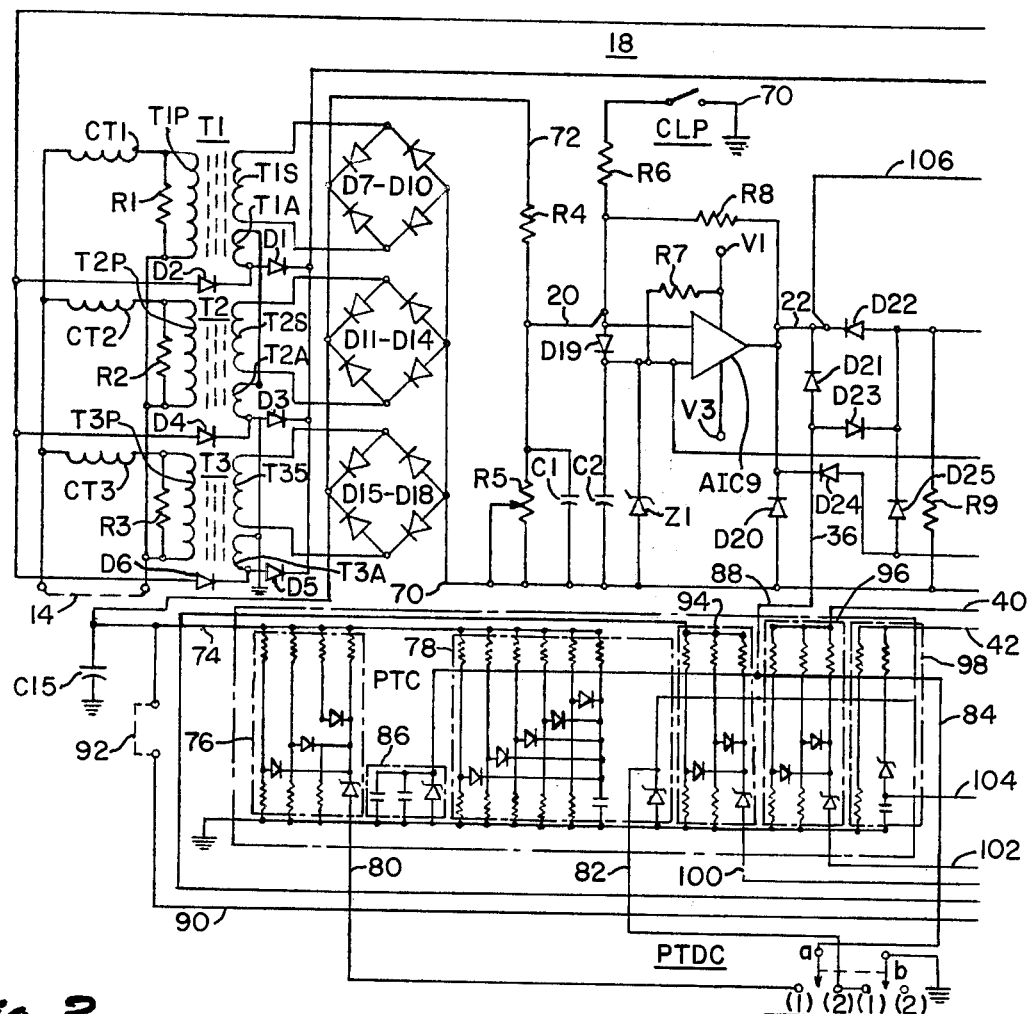
FIG. 3 consisting of FIGS. 3a, 3b and 3c is a circuit diagram of the recloser control system.
Figure 3A:
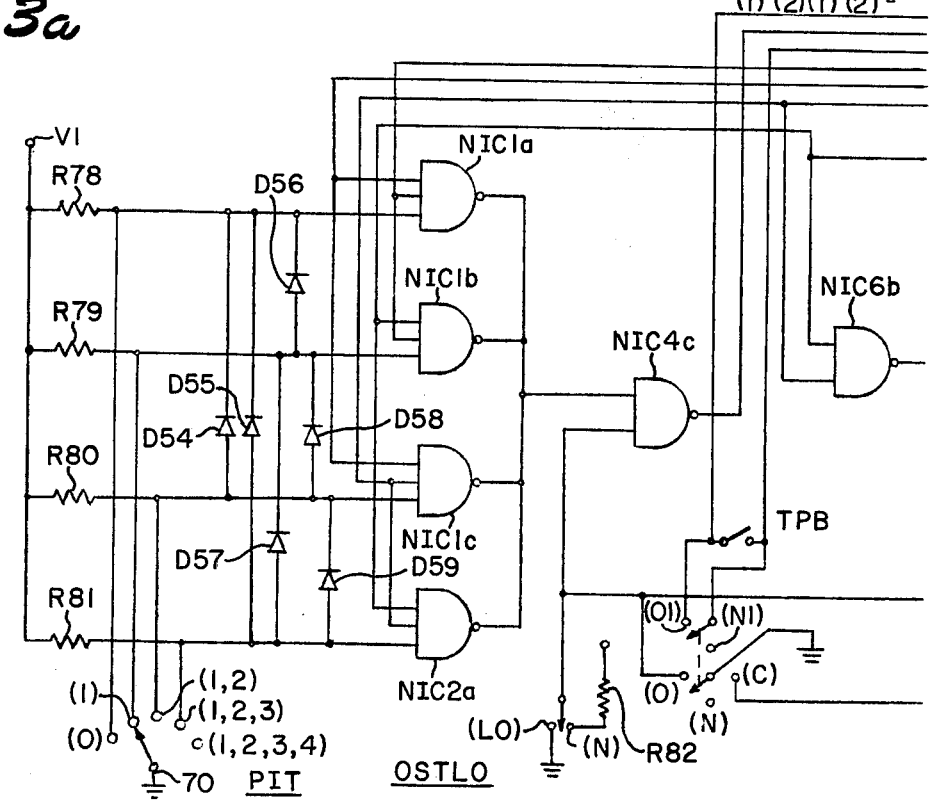
Figure 3B:
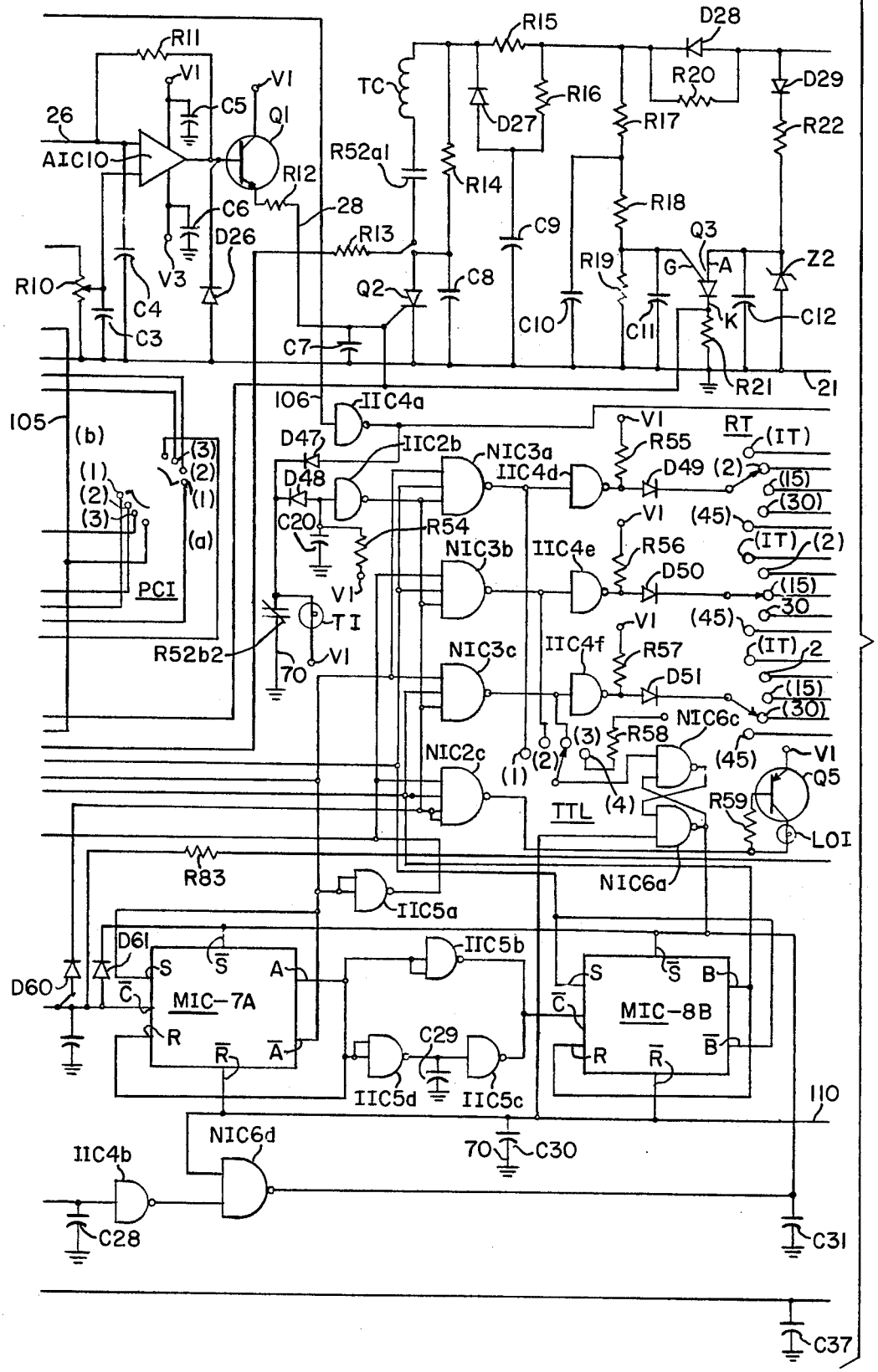
Figure 3C:
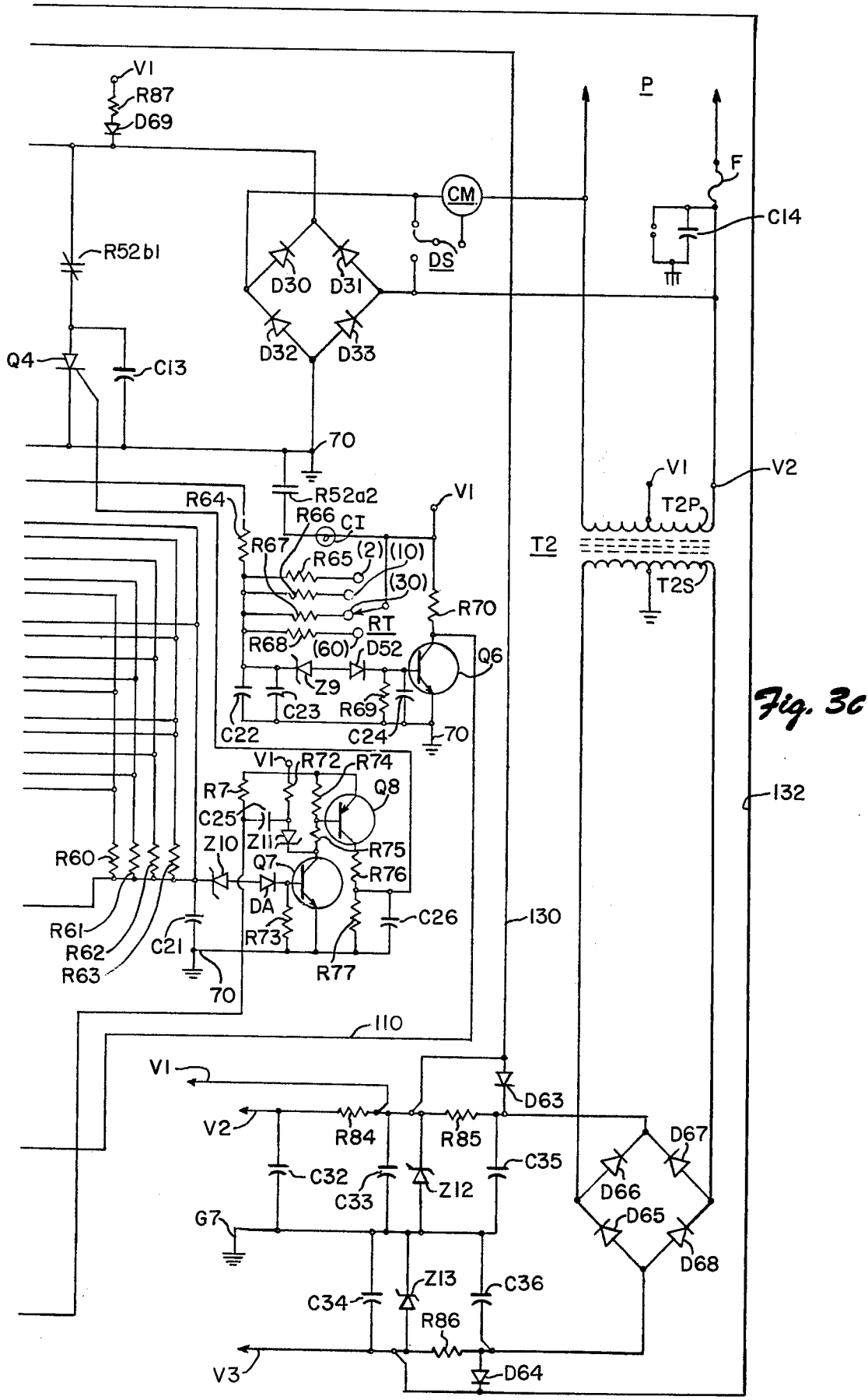

Referring now to FIG. 2, a functional block diagram of the circuit recloser system 18 is shown. For simplicity of illustration, a circuit breaker interrupter or recloser 20 having separable main contacts 22 for protecting a single electrical circuit or conductor 24 is shown. Line 24 may interconnect electrical circuits 26 and 28. It is to be understood that the circuit breaker interrupter or recloser 20 may be adapted to have multiple separable main contacts for interconnecting polyphase alternating current or multiple lead direct current. For the purposes of this embodiment of this invention line 24 represents a single phase line of alternating current. In this embodiment of the invention line 24 is monitored by sensor 30 which in this embodiment is a electrical current transformer but which in other embodiments of the invention may be any suitable sensing device. Sensor 30 has a low-voltage-current and over-voltage-protection network 32 as part thereof. This latter network and the electrical devices and components thereof are electrically connected to the main power supply 34 for interaction therewith. Main power supply 34, in this embodiment of the invention, derives electrical energy from line 24. It is to be understood, however, that other sources of electrical energy including other sources of alternating current or direct current may be used to supply the energy for main power supply 34. In this embodiment of the invention main power supply 34 is grounded at G and provides three output voltages; namely, V1, V2, and V3. Voltages V1 and V3 are generally equal in absolute value but opposite in polarity so that voltage V1 may be positive and voltage V3 may be negative. Voltage V2 is generally of the same polarity as voltage V1 but of a lower absolute value. Voltages V1, V3, and V2 are adaptable for empowering or energizing the components of the static controller 9 shown in FIG. 1. As an example, voltage V1 may be fifteen volts direct current positive and may be useful for empowering certain families of integrated circuits which may be used in the static controller 9.

Sensor 30 may be grounded and in this embodiment of the invention may provide a voltage across output capacitor C15. The voltage from output capacitor C15 is provided simultaneously to a minimum trip circuit 36, THE PHASE CURVE INST. selector switch, and a time delayed program circuit 38. The output of the PHASE CURVE INST. selector is also provided to the time delay program current 38. The time delay program circuit 38 has one output which is provided to the previously described TD switch shown in FIG. 1 and from there to a level detector 40. The output of the time delay program circuit 38 is also provided to level detector 40. The output of the level detector 40 is provided to a trip circuit 42 which contains therein the trip coil of the previously described circuit interrupter breaker or recloser 20. Consequently, energization of the trip coil within trip circuit 42 will cause circuit breaker 20 to trip by action of the mechanical interconnecting piece 43. The trip circuit is empowered gy a special trip circuit power supply 44 which derives its energy from the main power supply 34. The actual operation of the trip circuit power supply 44 will be described hereafter with respect to FIG. 3. The trip circuit power supply provides a signal to a trip circuit power supply failsafe circuit 46. Trip circuit power supply failsafe circuit 46 provides an input to the trip circuit 42 so that trip circuit 42 can be energized to cause the circuit breaker 20 to trip to open the separable main contacts 22 should energy stored in the trip circuit power supply 44 fall below acceptable minimum energizing levels. As was previously mentioned, the voltage signal across capacitor C15 is provided to a minimum trip circuit 36, the output of which is provided to a level detector 40 to act as an enabling means therefor. The output signal from minimum trip circuit 36 is also simultaneously provided to a reset circuit 48 the function of which will be described hereafter. The previously described manual electric remote control switch is electrically and functionally connected to trip circuit 42 as is the previously described TEST pushbutton. When the circuit breaker has opened initially after the sensing of a fault or for any other reason, information of this is provided by means of the auxiliary contacts of the circuit breaker to a contact position circuit CP. The output of the contact position circuit CP provides information simultaneously to a plurality of functional elements in the recloser system 18. Each time the circuit breaker closes after a previous reopening, an information signal is provided in the previously described reset circuit 48 for initiation of the reset operation. This signal may be disabled by the presence of an output signal from the previously described minimum trip circuit 36. The contact position circuit also provides an input to a decoder 50. A binary counter 52 also provides an input signal to the decoder 50 and under certain operating conditions the presence of the signals from the contact position circuit CP and the binary conunter 52 will cause an output signal to be generated by decoder 50, which output signal will be provided to a reclose time delay circuit 54 and a trips to lockout control circuit 56. The trips to lockout control circuit 56 provides an indexing signal for the binary counter 52 so that the counter 52 will index to change its count. In this embodiment of the invention, the counter may count in a binary manner from 0 to 3 or said in another way may change through four index positions. The binary output of the binary counter 52 is provided as was previously described to the decoder 50. The output information from the reclose trigger 58 is provided to a motor close circuit 60 which includes the electrical motor for charging the closing spring of the previously described circuit breaker 20 and is mechanically interconnected thereto by way of mechanical linkage 61. The previously described manual electric remote control switch has an output which is also provided to the motor close circuit 64 for manually closing circuit breaker 20.

The previously described contact position circuit CP provides an output signal to the input of the previously described binary counter 52 for causing indexing thereof. The output of the binary counter 52 is connected to a circuit for determining the number of phase instantaneous trips which may occur during the circuit recloser system duty cycle. This circuit is known as the phase instantaneous trip control circuit 62. The output thereof is connected to the output of the time delayed program circuit 38 to act as a disabling means therefor. Consequently, if the phase instantaneous trip control circuit 62 has a signal existing on its output terminals, it will effectively prevent the signal at the output terminal of the time delayed program circuit 38 from actuating or energizing the lever detector 40. In a like manner, a one shot to lockout circuit 64, the function of which has been described previously, is connected to the same output terminal of the previously described time delay program circuit 38 to disable it in appropriate circumstances as was previously described.

The operation of the recloser system 18 may best be described by reference to the following illustrating but not limiting example: Referring to FIG. 1 again, presume the following settings have been made or preset on the program or selector switches within the cutout 16 of panel 14. The PHASE INSTANT TRIP switch is set to "2" meaning two relatively instantaneous openings will occur during the duty cycle. The TD switch is set to 2, indicating the second of two possible time delayed characteristic delays will be used. This means that the time delayed opening of the duty cycle of the recloser will open according to a time characteristic determined by program 2. Set the PHASE CURVES INST switch to 2. Which means the second of three possible short time-delayed time characteristic curves is used during the generally substantially instantaneous openings of the circuit breaker during the duty cycle. Set the TRIPS TO LOCKOUT switch is set at "4" which means four trips, including the initial trip, will occur with subsequent intermediate reclosings before a lockout takes place. Set the reclose time switches respectively at IT or instantaneous for the first reclose 2 or 2 seconds for the second reclose and "30" or 30 seconds for the third reclose. This means that the previously described reclosing after previously trips will respectively take place instantaneously, after 2 seconds, and after 30 seconds. Set the reset time at 2 which means the entire power recloser static control will be reset to an initial condition or state if the circuit breaker closes at any time during the duty cycle on a nonfaulty line after 2 seconds. Also set the COLD-LOAD switch, the ONE SHOOT TO A LOCKOUT switch and the manual operation switch (not shown) to the neutral or normal positions as the case may be.

Referring once again to FIG. 2 presume a fault current of sufficient magnitude exists on line 24 between circuits 26 and 28. Unlike these conditions it is desirable to open separable main contacts 22 so that circuits 26 and/or 28 may be protected from the further flow of damaging overload current therein. The sensor 30 will monitor the current flowing in line 24 and provide a voltage signal across capacitor C15 which is proportional to the amount of overload current flowing in line 24. This signal will be provided to the minimum trip circuit where it will cause an output signal to exist on the output terminals of the minimum trip circuit 36 is the voltage across capacitor C15 has reached a predetermined minimum value. This output signal will enable the previously described level detector 40 to therefore accept energizing signals from the previously described time delay program circuit 38, the phase instantaneous trip control circuit 62, the one shot to lockout circuit 64 and the T.D. circuit. The voltage signal across capacitor C15 will be provided simultaneously to the PHASE CURVES INST. selector which is programmed to provide a signal to only that portion of the time delayed program circuit 38 which corresponds to the second instantaneous time characteristic curve so that a signal will be provided thereafter to the now enabled level detector 40 for subsequent energization of the trip circuit 42 to cause linking means 43 to cause circuit breaker or interrupter 20 to open or trip separable main contacts 22. Since the ONE SHOT TO LOCKOUT selector switch is in the normal state, no signal is provided from the one shot to lockout circuit 64 to disable the output signal from the time delayed program circuit 38. In a like manner since the phase instantaneous trip selector is set at 2 and since no trips have occurred up until the time the input signal was present on the output terminal of the time delayed program circuit 38, that circuit will not act to disable the level detector 40. Consequently, the previously described first trip will take place and the leador line 24 will be interrupted by the movement of the separable main contacts 22 away from the contacts on the line 24. At this point the auxiliary contacts of the circuit breaker or interrupter 20 will engage providing an input signal to the contact position circuit or CP circuit. This will provide signals simultaneously to a number of functional blocks in the recloser control system 18. One of these signals will be provided to the decoder 50 and from thence depending upon the state of the counter 52 to that portion of the reclose time delay control circuit 54 corresponding to the first RECLOSE TIME SELECTOR switch as shown in FIG. 1. Since this latter switch is set in the instantaneous position IT, there will be no time delay and an output signal will be provided instantaneously or generally instantaneously from the relcose time delay control circuit 54 to the reclose trigger 58 which then provides a signal to the motor close circuit 60 causing a charging of the closing spring therein and a subsequent closing of the separable main contacts 22 by the cooperating action of the inter-linking mechanical means 61 of the circuit breaker 20. As soon as the circuit breaker recloses for the first time an output signal from the contact position circuit CP will provide a clock pulse to the counter 52 causing the counter 52 to index one count. When the contact position circuit CP provides the initial signal to decoder 50 it simultaneously provides a signal to the reset circuit 48 thus beginning the rest delay cycle which is set for 2 seconds and it also discharges the reclose timer capacitor in the reclose time delay circuit 54. If the circuit breaker reclosed on a cleared line 24, 2 seconds thereafter the reset circuit would have provided an output signal to the trips to lock-out control 56 and the reset terminal of the counter 52 causing both of these elements to reindex to the first or initial state thereof. The trips to lockout control 56 was provided with an input signal by the decoder 50 at the same time the reclose time delay control 54 was provided with the same input signal. Since four trips to lockout are necessary for the trips to lockout circuit 56 to provide a disabling output signal therefrom to the counter 52, it can be seen that no such signal will be provided until three subsequent trips have taken place.

Presuming that the circuit breaker closed on a faulty or overloaded line 24 or said in another way presuming that line 24 has not yet been cleared of the fault. Sensor 30 will once again sense the fault and will once again provide a voltage signal across the capacitor C15. Once again this signal will be provided to the minimum trip circuit 36 and when the signal reaches a predetermined value the level detector 40 will be enabled to receive signals from the other circuits previously described. Once again a signal will be provided to the phase curve instantaneously selector circuit and to the second of the three possible phase curves in the time delayed program circuit 38. The output signal therefrom will be provided once again to the level detector 40 provided the one shot to lockout circuit 64 has remains unchanged and provided the phase instantaneous trip control 62 has not been indexed by the counter to the second position. Since in fact the phase instantaneous trip control 62 has only been indexed to the first position, the output signal from the time delayed program circuit 38 will be provided to the level detector 40 which will in turn cause an energization of the trip current 42 thus causing the tripping of the circuit breaker 20 and the opening of the separable main contacts 20 for the second time. As was previously the case, the contact position switch will be once again energized. The signal from the contact position circuit CP will be provided to decoder 50 and to the counter 52 which is in the binary 1 state. Counter 52 will provide a signal to the second portion of the reclose time delay control and according to the 2 second delay which had been previously programmed therein, a delay of 2 seconds will pass before the reclose trigger 58 is once again energized causing the motor closing circuit 50 to actuate the mechanical linkage 61 to cause the circuit breaker 20 to reclose the separable main contacts 22 on line 24. The reclosing of circuit breaker 20 will cause the contact position circuit CP to change states causing the counter 52 to change to the binary 2 state and discharges the reclose timer capacitor in circuit 54 as mentioned previously. And the output signal from the decoder 50 will be once again provided to the trips to lockout control circuit 56 where it will be determined that only two trips have occured so far and thus the output terminal of the trips to lockout control circuit 56 will not be actuated to disable the counter 52. As was the case previously, a signal was provided to the reset circuit 48 which will cause a reset of the trips to lockout control circuit 56 and the counter 52 according to the manner previously described if the circuit breaker 22 closes on an unfaulted or clear line 24. However, if line 24 remains faulted, sensor 30 will for the third time detect this, provide signals as previously discussed to the minimum trip circuit 36 to enable level detector 40. Since the phase instantaneous trip control 62 has been set for two trips of the circuit breaker 20 and since the counter 52 has indicated that two trips have occurred, the instant trip or fast time delayed program circuit 38 will be disabled at its output and consequently, the T.D. or relatively long time delay circuit which was set to produce an output signal at the output terminals thereof after a relatively long period of time has elapsed, corresponding to the second of the two possible time delayed characteristic, will thereby provide a time delayed signal significantly longer in duration than the previously described two signals to the level detector 40 causing a subsequent tripping of the circuit breaker 20. Once again the contact position circuit CP will be energized to produce output signals to the decoder 50 and since the counter 52 is in the binary two positions, the signal therefrom will be routed to that portion of the reclose time delay control circuit 54 corresponding to a 45 second time delay before the reclosing of circuit breaker 20. In fact 45 seconds will elapse after the opening of circuit breaker contacts 22 before a signal is provided to the reclose trigger 58 to cause subsequent reclosing of the circuit breaker 20. Upon the reclosure of the circuit breaker 20, the contact position circuit CP will provide a signal to the reset circuit 48 and to the counter 52 thus indexing the counter 52 to the binary "3" three state and will discharge the reclose circuit 54. If the circuit breaker 20 closes on a faulty line, the sensor 30 for the fourth time will detect this and provide signals in the manner previously discussed. Once again, a time delayed signal will be provided to the level detector 40 corresponding to the time and current characteristic associated with the second T.D. position. After that time delay has elapsed, the level detector 40 will be energized to cause the trip circuit 42 to once again open. When this occurs, the decoder 50 will provide a signal only to the trips to lockout control circuit 56 as there are no longer available positions on the reclose time delay control circuit 54 for accepting signal information from decoder 50. Since four trips have occured and since the TRIPS TO LOCKOUT switch has been set at 4, a disabling signal will be provided at the output terminal thereof to prevent subsequent indexing of counter 52. Since no signal has been directed to the reclose time delay control 54, no signal can be directed to the reclose trigger 58 and the motor close circuit 60 cannot be energized to cause any further closings of the circuit breaker 20 during the automatic duty cycle of the recloser system 18. The only way that circuit breaker 20 can now be closed is by energizing the electrical remote control switch to the closed position or actually manually closing the circuit breaker thus causing the circuit breaker 20 to close. If a fault occurs, since the counter is not changed from its last position because of the disabling action of the output of the trips to lockout control 56, the last portion of the duty cycle of the recloser system 18 will be repeated and this will continue to occur everytime the manual electrical remote control is actuated to the closed position. Had the circuit breaker 20 been actuated to close on an unfaulted or clear or nonoverloaded electrical conductor 24 at anytime during the duty cycle previously described. Prior to lockout, no fault would have been sensed by sensor 30 and consequently no signal would have been applied across capacitor C15. This being the case, the reset circuit 48 would time out according to the preset program of 2 seconds and thereafter provide an output signal to the trips to lockout control 56 and the counter 52 resetting them to their initial state. In the case of the counter that would have been to a 0 binary state. Once this happens if a subsequent fault occurs, the entire duty cycle can be repeated from the start.

It will noted that the sensor 30 contains therein a low voltage circuit and overvoltage protection network 32 which is directly interconnected with the main power supply 34. The electrical operation of this circuit 32 will be described hereafter in reference to FIGS. 3, 4, 5 and 6. The coldload pickup device 66 is provided as an input device for the minimum trip circuit 36 in certain circumstantances such as when the circuit breaker is desired to be closed on a dead line for energizing that line from one of the circuits 26 of 28, the coldload pickup provides a lower degree of sensitivity for the minimum trip circuit thus allowing the tranients which may occur during the closing of a dead line on a hot line to be sensed by the sensor without unnecessarily tripping the minimum trip circuit 36.

Had it been desired to test a normally functioning circuit breaker 20 during nonfault conditions, the test circuit 68 could have been actuated to provide a direct signal to the trip circuit 44 to thereby cause actuation of the trip circuit from the power supply 34 thus opening circuit breaker 20. The closing of circuit breaker 30 could then be accomplished by the use of the manual electrical remote control switch as previously described or automatic reclosure will take place.

The trip circuit power supply failsafe circuit 46 senses the power supply voltage level on the trip circuit power supply 44. In those cases where it is sensed that the trip circuit power supply level 44 is about to change to a voltage insufficient to energize trip circuit 42, the trip circuit power supply failsafe circuit 46 will provide a tripping signal to the trip circuit 42 to use the remaining available energy in trip circuit power supply 44 to trip circuit breaker 20 even though no fault may have occurred on the line 24 this is an automatic operation.

Referring now to FIG. 3, a schematic circuit diagram of the recloser system 18 shown in FIG. 2 is depicted. For convenience of illustration, the circuit interrupter or breaker 20 and the mechanical linkages connected thereto; namely, linkage 43 and linkage 61 as well as the separable main contacts 22 the power line 24 and the circuits 26 and 28 all shown in FIG. 2 have been deleted. Three current transformers are shown and designated CT1, CT2, CT3. The three current transformers are shown in this embodiment of the invention for monitoring three lines of a three phase alternating current electrical power system which are being protected by a circuit breaker such as circuit breaker 20 shown in FIG. 2, it being understood that the circuit breaker 20 is being controlled by the control system depicted in FIG. 3. In this embodiment of the invention each of the three previously described current transformers or sensors are connected in series circuit relationship with the primary of a potential transformer, consequently, current transformer TC1 is connected in series circuit relationship with primary T1P. In a like manner current transformer CT2 is connected at series circuit relationship with primary winding T2P and finally current transformer CT3 is connected in series circuit relationship with primary winding T3P. Connected in parallel circuit relationship across each of the Aforementioned primary windings is a voltage dropping resistive means or resistor. Primary winding T1P has resistive means or resistor R1 connected thereacross. And in a like manner, primary windings T2P and T3P have resistive elements or resistors R2 and R3, respectively, connected thereacross. Current transformer CT1 which has the parallel combination of primary winding T1P and resistive element R1 connected in series therewith is connected in parallel circuit relationship with the current transformer or sensor CT2 having primary winding T2P and parallel resistive element R2 connected in series circuit relationship therewith. Elements CT3, T3P and R3R previously mentioned are similarly connected with respect to the other elements. Potential transformers T1, T2 and T3 which have as primary windings T1P, T2P and T3P, respectively, also have secondary windings T1S, T2S and T3S, respectively, and auxiliary windings T1A, T2A, T3A, respectively. The secondary windings in each case is connected at the output terminals thereof to the input terminals of a static fullwave bridge rectifier. Each bridge rectifier has four solid state diodes connected in circuit relationship therein in the traditional bridge configuration. Consequently, secondary windings T1S, T2S and T3S are connected at the output terminals thereof to bridge rectifier means D7-D10, D11-D14, and D15-D18, respectively. The output terminals of the previously mentioned fullwave bridge rectifying means or rectifiers are connected in parallel circuit relationship to form an auctioneering circuit. The parallel output terminals of the previously described fullwave bridge rectifying means comprise an equivalent of the output terminal of sensor 30 shown in FIG. 2. At these output terminals, a DC voltage signal of level generally proportional to the amount of the highest current sensed by any of the three previously described current sensors or current transformer CT1, CT2 and CT3 is present. One of the output terminals of the fullwave bridge rectifier networks is connected to a system common or ground line 70. The other terminal or signal terminal 72 provides the voltage information to the remaining portions of the recloser control system. Specifically, a capacitive element or capacitor C15 is connected in parallel circuit relationship with the auctioneering bridge network across the output terminals or leads 72 and 70. Consequently, the voltage signal from the bridge network is filtered by the previously described capacitive means C15 to provide a slowly varying highly reliable voltage signal which is proportional to the highest level of current being sensed by any of the three previously described current transformers or current sensing means CT1, CT2 and CT3 at any instant of time. Connected across capacitive element C15 are two resistive means connected in series circuit relationship; namely, resistive means R4 and resistive means or potentiometer R5. A capacitive element C1 is connected in parallel circuit relationship with resistive element R5 and the series circuit configuration of a diode D19 and capacitive element C2 is also connected across resistive element R5 with the anode of diode D19 being connected to the high side of resistive element R5 and one end of the capacitive element C2 connected to the other side of resistive element R5 at line 70. Connected in parallel circuit relationship with the capacitive element C2 is a voltage regulating means such as Zener diode Z1. The regulating terminal of Zener diode Z1 is connected to D19 and the other end of capacitive element C2. The anode of Zener diode Z1 is connected to the previously described common terminal or bus 70. Connected to the anode of diode means D19 is one end of a resistive means R6. Connected to the other end of resistive means R6 is the switch generally designated CLP which was referred to with respect of FIG. 1 as the COLDLOAD PICKUP switch. The other end of the switch CLP is connected to ground or system common 70. Normally, switch CLP is in the open position. The input terminals of a differential amplifier means AIC9 are connected respectively to either side of the previously described diode D19. The low or cathode side of the diode D19 represents the reference voltage level of the differential amplifier means AIC9. As will be recalled, it is at this reference point that the regulating terminal of the previously described regulating means of Zener Diode Z1 is also connected. At the anode end or upper end of diode D19 is connected the signal lead of the differential amplifier means AIC9 or that lead to which the signal from the previously described auctioneering circuit is supplied. In this embodiment of the invention, the differential amplifier AIC9 comprises an integrated circuit. The particular integrated circuit differential amplifier AIC9 requires that terminals thereof power supply be connected to sources of power or with voltages of V1 and V3. Also connected to power supply or voltage source V1 is a resistive element R7, the other end of which is connected to the regulating terminal of the Zener diode Z1. A resistive element or resistor R8 is connected in parallel with the signal input terminal of the differential amplifier AIC9 and the output terminal of the differential amplifier AIC9. One end of resistive element R8 is also connected to the anode of diode D19 and the other end of resistive R8 is also connected to the cathode of four diodes D20, D21, D22 and D24. The anode of diode D20 is connected to the common line 70. The anode of diode D22 is connected to the signal input terminal of another differential amplifier AIC10. The anode of diode D21 is connected to one of the output terminals of the phase time card PTC the use of which will be described in more detail hereafter. The anode of diode D24 is connected to one pole of a switch PCl which is generally the same as the switch referred to with respect to FIGS. 1 and 2 which is designated as the PHASE CURVES INST. selector switch. The anode of diodes D24 is also connected to the output terminal of a NAND GATE NIC4, the function of which will be described hereafter. A diode D23 is connected at its anode to the anode of diode D21 and at its cathode to the anode of diode D22. Also connected to the cathode of diode D23 is the cathode of a diode D25, the anode of which is connected to the anode of diode D24. A resistive element R9 is connected between the anode of diode D22 and the common line or system ground 70. The resistive element R9 is therefore connected across the output terminals of what may be considered the minimum trip circuit 36 of FIG. 2. A resistive element R10 or potentiometer is connected between the system common line or ground 70 and the reference input terminal of the previously described differential amplifier AIC9. The wiper or movable contact of the resistive element or potentiometer R10 is connected to the reference differential input terminal of the previously mentioned differential amplifier AIC10. Connected between this terminal and system common line 70 is a capacitive element C3. Connected between the previously described signal input terminal of amplifier AIC10 or that terminal connected to the anode of diode D22 is another capacitive element or capacitor C4. Connected in parallel circuit relationship with the input signal terminal and output terminal of amplifier AIC10 is a resistive element R11. Amplifier AIC10 which is a differential amplifier is in this embodiment of the invention and integrated circuit differential amplifier. It is energized by two power supply voltages V1 and V3 in a manner similar to the way in which the previously described differential amplifier AIC9 is energized. In addition, the energization terminals or those terminals connected to power supply voltages V1 and V3, respectively, have connected thereto and to ground two capacitive elements C5 and C6, respectively. Since in this embodiment of the invention the common line or system common 70 is grounded, it may be said that the grounded end of the capacitive elements C5 and C6 previously described are connected to the ground or system common terminal 70. Connected to the output terminal of amplifier AIC10 is the cathode of a solid state diode D26 the anode of which is connected to system common terminal 70. Also connected to the output terminal of differential amplifier AIC10 is the base of and NPN transistor Q1. Connected to the collector of transistor Q1 is the voltage source V1 and connected to the emitter of transistor Q1 is one end of a resistive element R12, the other end of which is connected to one side of a capacitive element or capacitor C7 and to the gate of a silicon control rectifier or similar gated switching means Q2. This latter terminal may be considered of the output terminal of level detector 40 as shown in FIG. 2. The other end of the previously described capacitive means or capacitor is connected to the system common 70. Silicon control recitifier Q2 which in other embodiments of the invention may be a thyristor is connected at the cathode thereof to the previously described ground terminal 70 and at the anode thereof to one end of a resistive means or resistor R13 the other end of which is connected to a "1" pole of a switch designated TPB which generally corresponds to the TEST pushbottom switch shown in FIGS. 1 and 2 the function of which will be described more completely hereafter. Also connected to the anode of silicon control rectifier Q2 is the high side of a capacitive element or capacitor C8 the low side or other terminal of which is connected to system common 70. And also connected to the anode of silicon control rectifier Q2 is one end of an auxiliary contact R52a1 of a circuit breaker or interrupter such as 20 shown in FIG. 2. This contact is normally closed when the circuit breaker separable main contacts are closed. The other end of contact R52a1 is connected to the trip coil TC of a circuit breaker such as 20 shown in FIG. 2. The other end of trip coil TC is connected to one end of a resistive element R14 and one end of a resistive element R15. The other end of resistive element R14 is connected to the anode of the previously described silicon rectifier Q2. Also connected to the latter end of the trip coil TC is the cathode of a diode D27 the anode of which is connected to one terminal of a capacitive element C9 the other terminal of which is connected to the system common 70. Connected to the other end of the previously described resistive means R15 is one end of a resistive means R16, the other end of which is connected to the anode of the previously described diode D27. Connected to the junction between the previously described resistive elements R15 and R16 is one end of a resistive element R17, one end of a resistive element R20 and the cathode of a diode D28. The other end of resistive element R17 is connected to the high side of a capacitive means or capacitor C10 and to one end of a resistive element R18. The other end of resistive element R18 is connected to one end of a resistive means R19, one end or the high end of a capacitive means C11 and the gate terminal of a unijunction transistor Q3. The cathode terminal of unijunction transistor Q3 is connected to one end of a resistive element R21. The other ends respectively of the capacitive elements C10 and C11 and the resistive elements R19 and R21 are connected to the system common 70. Connected between the anode of unijunction transistor Q3 and the system common 70 is a capacitive means or capacitor C12 across which is connected a voltage regulating means or Zener diode Z2, with the regulating terminal of the Zener diode means Z2 being connected to the high side of capacitive means C12 and the anode of unijunction transistor Q3. Also connected to the regulating end of Zener diode Z2 is one end of the resistive element R22, the other end of which is connected to the cathode of a solid state diode D29. The anode of the solid state diode D29 is connected to the other end of the previously described resistive element R20 and the anode of the previously described solid state diode D28. Also connected to the cathode of the previously described unijunction transistor Q3 is the previously described gate terminal of the silicon control rectifier Q2. And as was described previously, this terminal is connected to one side of the test pushbutton TPB. Connected to the anode of the previously described diodes D28 and D29 is one end of an auxiliary contact R52b1, the other end of which is connected to the anode of a silicon rectifier Q4 and the high side of a capacitive element C13. The cathode of silicon control diode Q4 and the other end of the capacitive element C13 are connected to a system common line 70. The auxiliary contact R52b1 is the auxiliary contact of a circuit breaker or circuit interrupter such as 20 shown in FIG. 2. Auxiliary contact R52b1 is normally closed when the circuit breaker or circuit interrupter or separable main contacts are open. Also connected to the anodes of diodes D28 and D29 are the cathodes of diodes D30 and D31, the anodes of which respectively are connected to the cathodes of diodes D32 and D33, respectively. The anodes of diodes D32 and D33, respectively are connected to system common ground 70. As can be readily seen, the arrangements of diodes D30 through D33 form a standard full-wave bridge rectifying network. The junction between the anode of diode D30 and the cathode of diode D32 is connected to one terminal of the closing motor CM of a circuit breaker, such as circuit breaker 20 shown in FIG. 2, and to one pole of a three pole drum switch designated DS. The terminal between the anode of diode D31 and the cathode of diode D32 is connected to another pole of the three pole drum switch DS. The third of the three pole drum switch DS is connected to another terminal of the closing motor CM. The final terminal of the closing motor CM is connected directly to one side of the AC line or input power supply P. In another embodiment of the invention the closing motor CM may be connected between the relay R52b1 and the anode of the SCR Q4. The terminal between the anodes of the previously described diode D31 and the cathode of the previously described diode D33 is also connected to the other side of the power line or power supply P through a fuse F. Between the one end of the fuse F and ground may be connected a capacitive element C14 having parallel terminals thereacross for whatever useful purposes are desired, such surge suppression is also connected between that end of the closing motor which is connected to the power line p and the previously described end of the fuse element F is the primary winding T2P of the system power supply transformer T2. The AC power line provides a voltage source V2 across the previously described winding T2P. This winding is center tapped to provide an AC voltage source V1. Or winding T2P may be directly connected to a 120 volt source. In this embodiment of the invention, the AC power supply line V2 is 240 volts of alternating current and therefore the voltage V1 is 120 volts of alternating current. The secondary winding T2S of transformer T2 is grounded at the center tap thereof and is connected at either end thereof to the input terminals of a fullwave bridge rectifier D65-D68.

The previously described silicon control rectifier Q2 represents a portion of the trip circuit 42 shown in FIG. 2. The unijunction transistor Q3 represents a portion of the trip circuit power supply failsafe circuit 46 shown in FIG. 2. The silicon controlled rectifier Q4 represents a portion of the motor closed circuit 60 shown in FIG. 2 and the diode bridge arrangement D30 through D33 represents a portion of the trip circuit power supply 44 shown in FIG. 2.

As was mentioned previously, there is connected across the capacitor C15, a PHASE CURVES INST. selector switch and the time delayed program circuit 38 as shown in FIG. 2. As has also been previously stated, the output from the PHASE CURVES INST. selector switch is also provided to the time delay program circuit 38. The time delay program circuit 38 provides two sets of outputs one of which goes directly to the level detector 40 and another of which goes through the T.D. switch of FIG. 2 to the level detector 40. The phase drive output is subject to a disabling operation by the minimum trip circuit 36 as previously described and by the phase instantaneous trip control 62 and the ONE SHOT TO LOCKOUT control 64. In FIG. 3 the electrical components of the PHASE CURVE INST. selector switch, the time delayed program circuit 38 and the T.D. switch and their respective relationship with the level detector 40 are shown. In this embodiment of the invention, the signal line 74 is provided as a source of power supply to two diode matrix relatively long time delay generator circuits 76 and 78, respectively on program card PTC. Output conductors 80 and 82 from the previously described relatively long time delayed functional matrixes 76 and 78, respectively are fed to the previously described T.D. selector switch PTDC. Line 80 is fed to the first contact on deck and the line 82 is fed to the second contact on deck $a$. The second contact on deck $a$ is electrically connected to the first contact on deck $b$ and the second contact on deck $b$ is unconnected. The wiper on deck $b$ is grounded. The wiper on deck a feeds back through line 84 to a regulated charging network 86 on the PTC card and from there through line 88 to the anodes of the previously described diodes D21 and D23 of the level detector circuit 40 of FIG. 2. Electrical conductor 90 which is also connected to the high side of the capacitor C15 is connected through a removable link 92 to the wiper of deck $a$ of the three position switch known as the PHASE CURVES INST. switch designated PCI. An electrical conductor from the first contact on deck a of the PCI switch is connected to a first relatively short time delayed matrix circuit 94 on the PTC card, a conductor from the second terminal on deck $a$ of the PCI switch is connected to a second relatively short time delayed circuit 96 and in a like manner the third contact of the PCI switch is connected through a conductor to the third relatively short time delayed circuit 98. In a like manner the previously desirable leads 100, 102 and 104 are electrically connected to the inputs of the relatively short time delayed function generators 94, 96 and 98, respectively and terminals 1, 2 and 3 of deck $b$ of the PCI switch respectively. The wiper of PCI switch is connected to the anodes of diodes D24 and D25 and to the output terminal of the NAND GATE NIC4$c$.

Connected to the output terminal of amplifier AIC9 is a lead 106 which is connected to the input terminal of a NAND inverter IIC4$a$. The output of the previously described inverter is connected to the anode of a diode D47 and one end of a resistive element or resistor R64 which acts as an input terminal for the reset circuit 48 depicted in FIG. 2.

Diode D47 is part of the previously described contact position circuit CP depicted in FIG. 2. The cathode of diode D47 is connected to the cathode of a diode D48 and to one side of an auxiliary relay R52$b$2 which has operating characteristics the same as the previously described relay R52$b$1. The other side of relay R52$b$2 is connected to ground or system common 70. The cathode of diode D47 is also connected to one side of an indicating lamp designated TI which corresponds to the trip indicating lamp "TRIPPED" shown in FIG. 1. The other end of lamp TI is connected to the V1 voltage source for energization. The anode of diode D48 is connected concurrently to one side of a capacitive element C20, one side of a resistive element or resistor R54 and the input terminal of a NAND GATE inverter IIC2$b$. The output of the previously described inverter is connected simultaneously to one input terminal of each of the decoder 50 NAND GATE circuit elements NIC3$a$, NIC3$b$, NIC3$c$ and NIC2$c$. The output of the previously described inverter IIC2$b$ is also conntected to the cathode of a diode D60, the anode of which is connected to the output terminal of a NAND GATE NIC6$b$. The output terminal of NAND GATE NIC3$a$ is connected to the input terminal of a NAND GATE inverter IIC4$d$ and to the first position of a selector switch TTL designated TRIPS TO LOCKOUT in FIG. 1. The output terminal of NAND GATE NIC3$b$ is connected to the input terminal of an inverter IIC4$e$ and to the second position of the previously described switch TTL. The output of NAND GATE NIC3$c$ is connected to the input terminal of NAND GATE inverter IIC4$f$ and to the third contact position of the previously described switch TTL. The output terminal of the NAND GATE NIC2$c$ is connected to one end of a resistive element R59 the other end of which is connected to the base of a PNP transistor Q5. In one embodiment of the invention the emitter of transistor Q5 is connected to voltage VI and the collector is connected to one end of an illuminating lamp designated LO for the LOCKOUT indicator as shown in FIG. 1. The other end of lamp LO is ground to the system common ground 70. The fourth terminal or contact position of the previously described TRIPS TO LOCKOUT switch TTL is connected to one end of a resistor R58, the other end of which is connected to power supply source V1. The wiper to the TRIPS TO LOCKOUT switch TTL is connected to a first input terminal of a NAND GATE NIC6$c$, the output terminal of which is connected to the first input terminal of a similar NAND GATE NIC6$a$. The output input terminal for NAND GATE NIC6$a$ is connected to the reset line as will be described hereafter. The output terminal of the previously described NAND GATE NIC6$a$ is connected to the other input terminal of NAND GATE NIC6$c$. Consequently, NAND GATES NIC6c and NIC6a have the output terminals thereof interconnected with one input terminal each of the other, respectively. The output terminal of the NAND GATE inverter IIC4d is connected to one end of a resistive element R55 and the anode of a diode D49. In a similar manner the output terminals of NAND GATE inverters IIC4e and IIC4f are connected respectively to one end each of a resistive element R56 and R57 and anode of diode elements D50 and D51, respectively. The other ends of resistive elements R55, R56 and R57 are connected to the V1 power supply voltage. The cathode of diode D49 is connected to the wiper of the first RECLOSE TIME selector switch shown in FIG. 1. The cathode of diode D50 is connected to a wiper of the second RECLOSE TIME selector switch shown in FIG. 1 and the of diode D51 is connected to the wiper of the third RECLOSE TIME selector switch shown in FIG. 1. The first or IT (instantaneous) terminal of each of the three RECLOSE TIME switches are electrically connected together and to the regulating terminal of a voltage regulating means or Zener diode Z10 and one end of a reclose timing capacitor C21 of the reclose time delay control 54 shown in FIG. 2. The regulating end of the Zener diode or voltage regulating means Z10 is connected to the anode of a diode D62 the cathode of which is connected to one end of a resistive element R83, the other end of which is connected to the second or two second time delay terminal 2 of each of the three RECLOSE TIME delay switches is connected to one end of a resistive element R60. The third contact position or 15 second time delay contact of each of the three RECLOSE TIME delay switches is connected to one end of a resistive element R61. The fourth contact or 30 second time delay contact of each of the three RECLOSE TIME delay switches is connected to one end of a resistive element R62. And the fifth contact or 45 second time delay contact of each of the three RECLOSE TIME delay switches are connected to one end of a resistive element R63. The other ends of each of the resistive elements R60 through R63 are connected to the regulating terminal of the voltage regulating means or Zener diode Z10. The anode of the Zener diode means Z10 is connected to the anode of a diode DA. The cathode of diode DA is connected to one end of a resistive element R73 and the base of a NPN transistor Q7. The collector transistor Q7 is connected to the regulating end of Zener diode regulating means Z11 and to one end of a resistive element R75, the other end of which is connected to one end of the resistive element R74 and the base of a PNP transistor Q8. The collector of transistor Q8 is connected to one end of a resistive element R76 the other end of which is connected to a resistive element R77, one end or one side of the capacitive element C26 and to the gate of a silicon control rectifier Q4. The other ends of resistive elements R71, R72, R74 and the emitter of transistor Q8 are connected to the power supply voltage V1. The other ends of resistive elements R73 and R77 and capacitive element C26 and the emitter of transistor Q7 are connected to the system common 70. In general, the elements to the right of Zener diode Z10 as shown in FIG. 3 comprise the elements of the reclose trigger 58 shown in FIG. 2.

As was described previously, the output terminal of the NAND GATE inverter IIC4a is connected to one end of the resistive element R64. The other end of resistive element R64 is connected to one end of the resistive elements R65 through R68 and to one end each of two capacitive elements C22 and C23 and to the regulating terminal of a Zener diode or voltage regulating means Z9. The other ends of the resistive elements R65 through R68 are connected respectively to the first or 2 second time delayed terminal of a reset time switch RT as shown in FIG. 1, the second terminal or 10 second time delay terminal, the third terminal or 30 second time delay terminal and the fourth terminal or 60 second time delay terminal of the same switch. The pole of the reset time delay switch RT is connected to one end of a resistive element R70, to the voltage V1 of the power supply for the circuit and to one end of a CLOSED indicator lamp CI such as shown in FIG. 1. The other end of lamp CI is connected to one side of the auxiliary contact R52a2 the other end of which is connected to the system common or ground 70. The other end or the anode or Zener diode regulating means Z9 is connected to the anode of a diode D52 the cathode of which is connected to one end of a resistive element R69, to one end of a capacitive element C24 and to the base of a transistor Q6. The other end of the capacitive elements C22, C23, C24 and the resistive element R69 and the emitter of transistor Q6 are connected to the system common 70. The collector of transistor Q6 is connected to the other end of resistive element R70 and to a lead 110 which is connected to the reset terminals of a counter (to be described), to one input terminal of a NAND GATE NIC6a (as was previously described), to an input terminal of another NAND GATE NIC6d, and to one side of a capacitive element C30 the other end of which is connected to system common or ground 70. Those elements to the right of capacitive element C22 and resistive element R64 including transistor Q6 generally comprise the elements of the reset circuit 48 described previously with respect to FIG. 2.

As was described previously with respect to FIG. 2, there exist in the control system a phase instantaneous trip control 62. The phase instantaneous trip control generally designated PIT in FIG. 3 comprises resistive elements R78 through R81 each connected at one end each thereof to a voltage source V1. The other end of resistive element R78 is connected to the first contact or the 0 PHASE instant trip contact of the PHASE INSTANT TRIP selector switch shown in FIG. 1. The same end of resistive element R78 is also connected to the cathodes of diodes D54, D55 and D56 and to one input terminal of a NAND GATE NIC1a. The anode of diode D54 is connected to the other end of resistive element R80, the anode of diode D55 is connected to the other end of resistive element R81, and the anode of diode element D56 is connected to the other end of resistive element R79. The other end of resistive element R79 is also connected to the second contact or the 1 contact of the PHASE INSTANT TRIP selector switch PIT. The same end of resistive element R79 is also connected to the cathode of a diode D57 and the cathode of a diode D58 as well as an input terminal for a NAND GATE NIC1b. The anode of diode D57 is connected to the other end of resistive element R81 and the anode of diode D58 is connected to the other end of resistive element R80. The other end of resistive element R80 is also connected to the third contact terminal or the 2 phase instantaneous terminal of the PHASE INSTANTANEOUS TRIP circuit PIT. The other end of resistive element R80 is also connected to the cathode of a diode D59 and to one input terminal of a NAND GATE NIC1c. The anode of diode D59 is connected to the other end of resistive element R81. The other end of resistive element R81 is connected to the fourth contact position or to the 3 contact of the PHASE INSTANT TRIP switch PIT. The other end of resistive element R81 is also connected to an input terminal of NAND GATE NIC2a. The fifth contact or the 4 contact of the PHASE INSTANT TRIP selector switch PIT is connected to nothing. The wiper of the PIT switch is connected to the system common 70. The output terminals of each of the previously mentioned four NAND GATES; namely, NIC1a, NIC1b, NIC1c and NIC2a are connected together to one input terminal of the previously described NAND GATE NIC4c. Another input terminal for the previously described NAND GATE is connected to the wiper of the ONE SHOT TO LOCKOUT switch OSTLO as shown in FIG. 1. The latter input terminal is also connected to the O contact of the manual remote electrical control switch for actuating circuit breaker CB20 shown in FIGS. 1 and 2. The latter mentioned switch comprises as was previously described an O, a C contact and a N contact. The N contact is a "normal" contact which is connected to nothing. The previously described switch is a two deck switch, the second deck of this switch has an O1 terminal and a N1 terminal. When the wiper of the previously described switch is in a normal position, no interconnections are made among the switch contacts. The wiper of the first deck is connected to system common or ground 70 and the wiper of the second deck is connected to one side of the TEST pushbutton switch. When the wiper of the remote control switch is placed in a O position, the previously described input terminal of the NAND GATE NIC4b is grounded through the wiper of deck 1 causing setting of the binary counter 52 to 3 thus causing lockout. The wiper of deck 2 is concurrently placed in parallel circuit relationship with the pushbutton switch TPB for automatically interconnecting the high side of the resistive element R21 and one side of the resistive element R13 for thereby increasing the gate voltage on the gate of silicon control rectifier Q2 thus energizing it to an ON state. The wiper of the ONE SHOT TO LOCKOUT switch OSTLO, which is connected to the previously described input terminal for the NIC4c gate, is movable between a NORMAL position contact and a LOCKOUT position contact. The LOCKOUT position contact is grounded. The NORMAL contact is connected through resistive element R82 to voltage source V1. The wiper of the ONE SHOT LOCKOUT switch OSTLO is also connected to the input terminal of a NAND GATE inverter IIC4b and to the high side of the capacitive C28 the low side of which is connected to system common of ground 70. The output terminal of the inverter IIC4b is connected to a second input terminal for the NAND GATE NIC6d it being remembered that the first input terminal is connected to the collector of transistor Q6. The output terminal of NAND GATE NIC6d is connected to one terminal of the capacitive element C31 the other terminal of which is connected to system ground, to the SET terminals of a counter as will be described hereafter to the output terminal of NAND GATE NIC6a, and to the cathode of a diode D6.

The anode of a diode D6 and diode D60 as well as one side of a capacitive element C27 and one end of a resistive element R83 as previously described are connected to the output terminal of a NAND GATE NIC6b. The other end of capacitive element C27 is connected to the system common. The output terminal of the NAND GATE NIC6b is connected to the $\overline{C}$ or clock bar input terminal of a bistable integrated circuit multivibrator MIC7-A. The latter multi-vibrator forms part of a counter circuit which as was mentioned before will be described hereafter. One input terminal for the previously described NAND GATE NIC6b is connected to the output of a NAND GATE inverter IIC5a. The output terminal of the latter inverter is also connected to one input terminal of integrated circuit NAND GATES NIC1b and NIC2a of the phase instant trip circuitry PIT previously described; and to one input terminal of the integrated circuit NAND GATES NIC2c and NIC3b of the decoder circuit previously described. The phase instantaneous trip control circuit PIT designated 62 in FIG. 2 and the decoder circuit as designated 50 in FIG. 2. In addition the ONE SHOT TO LOCKOUT selector switch is a designated 64 in FIG. 2.

The other input terminal for integrated circuit NAND GATE NIC6b is connected to the SET output terminal, B, of an integrated circuit multivibrator MIC8-B of the previously described counter which is designated 52 in FIG. 2. The latter mentioned counter output terminal is also connected to one terminal of NAND GATE integrated circuit NIC3c and NAND GATE integrated circuit NIC2c of the previously described decoder 50 shown in FIG. 2. The latter mentioned counter output terminal is further connected to one input terminal each of NAND GATE integrated circuits NIC1c and NIC2a of the phase instantaneous trip PIT control circuit 62 described in FIG. 2.

The reset output $\overline{A}$ of the bistable multi-vibrator integrated circuit MIC7-A is connected to the input terminal of the previously described NAND GATE inverter circuit IIC5a and back to the set triggers of the previously described multivibrator circuit MIC7-A. The set output A of the latter multi-vibrator is connected to the reset trigger of the same multi-vibrator and to the input terminals of two NAND GATE inverters IIC5b and IIC5d. The output terminal of the inverter IIC5d is connected to the input terminal of another inverter IIC5c and is also connected to the high side of a capacitive element C29 the low side of which is connected to systems common 70. The output terminal of the inverter IIC5c and the output terminal of the inverter IIC5b are connected to the clock input terminal $\overline{C}$ of the previously described integrated circuit bistable multi-vibrator circuit MIC8-B. The set output terminal B of the latter mentioned bistable multi-vibrator is connected as was previously described and also to the reset trigger R thereof. In a like manner the reset output terminal $\overline{B}$ is connected to the set triggers of the latter mentioned multi-vibrator and to one terminal each of the integrated circuit NAND GATES NIC3a and NIC3b of the previously described decoder 50. In addition, the latter mentioned output terminal is also connected to one input terminal each of the integrated circuit NAND GATES NIC1a and NIC1b of the phase instantaneous trip PIT control circuit 62. The reset output terminal $\overline{A}$ of the previously mentioned multi-vibrator circuit MIC7-A is additionally connected to one input terminal each of the NAND GATE integrated circuits NIC3a and NIC3c of the decoder 50 as well as one input terminal each of the NAND GATES NIC1a and NIC1c of the phase intantaneous trip PIT control 62.

A power supply circuit such as indicated by 34 in FIG. 2 is shown in FIG. FIG. 3. The output terminals of the previously described bridge rectifier network D65-D68 is connected at one output terminal thereof, (between the cathodes of diodes D66 and D67), to the cathode of a diode D63, to one end of the resistive element R85 and to one side of a capacitive element C35. The other end of the resistive element R85 is connected to the anode of the diode D63, to the regulating terminal of a voltage regulating means or Zener diode Z12, to one terminal of a capacitive element C33 and to one terminal of a resistive element R84. The last mentioned terminal comprises the output voltage terminal at which point the voltage V1 is present during normal operating conditions of the power supply. The other end of resistive element R84 is connected to one side of a capacitive element C32 this point between the capacitive element C32 and the resistive element R84 is where the previously referred to voltage V2 is present under normal operating conditions. The other side of the bridge rectifier network or the junction point between the anodes of diodes D65 and D68 are connected to the anode of a diode D64, one end of resistive element R86 and one side of a capacitive element C36. The other end of resistive element R86 is connected to the cathode of the diode D64, to the anode of a voltage regulating means of Zener diode Z13 and one side of a capacitive element C34. The latter mentioned junction comprises that point in the power supply means when the voltage V3 is present. The other end of each capacitive elements C32, C33, C34, C35 and C36 as well as the regulating end of the Zener diode Z13 and the anode end of the Zener diode Z12 are connected to system common terminal or ground 79. The anode of diode D63 is electrically connected to the cathodes of diodes D1, D3 and D5. The anodes of the latter mentioned diodes are connected respectively to the cathodes of diodes D2, D4 and D6 respectively and to one terminal each of the auxiliary windings T1A, T2A and T3A, respectively of the transformer T1, T2 and T3, respectively of the low voltage current and overvoltage protection circuit 32 shown in FIG. 2. The anodes of diodes D2, D4 and D6 are connected to the cathode of diode D64.

OPERATION OF THE POWER RECLOSER STATIC CONTROL CIRCUIT

The operation of the control system 18 shown in FIG. 2 a portion of which is schematic depicted in FIG. 3 can be described by way of illustration. Presume an electrical fault exists on electrical conductor 24 shown in FIG. 2. This fault may be the result of a temporary or permanent ground fault or may be the result of an electrical overload in either of the circuits 26 or 28 or both. The circuit recloser system 18 will react to the presence of said fault in a predetermined manner which is related to the settings on the various previously described selector switches and other controls as well as the internal connections of the various circuit elements within the control system. In typical operation, the circuit breaker or interrupter 20 will response to stimuli to cause separable main contacts to successively open and reclose for a predetermined number of times depending upon the status of the fault of the conductor 24 after each successive reclosing.

Referring once again to FIG. 3, presume that line 24 is monitored by one of the previously described current transformers CT1, CT2 or CT3. For purposes of illustration presume current transformer CT1 senses the status of electrical current in line 24 (not shown in FIG. 3). Current flowing in line 24 is sensed by current transformer CT1. Current transformer CT1 provides electrical current to the resistive element R1 and to the primary winding T1P of transformer T1. The voltage drop across resistive element R1 is reflected from the primary winding T1P to the secondary winding T1S. This voltage is impressed across the bridge D7 through D10. The bridge is a fullwave rectifying bridge and supplies energy by way of lines 72 and 70 to the capacitive element or capacitor C15 where the fluctuating direct current voltage is filtered to provide a voltage level which is generally proportional to the amount of current flowing in the previously described line 24. The series combination of resistive elements R4 and R5 are connected across the capacitive element C15. By adjusting the movable wiper of the potentiometer of resistive element R5, the voltage drop between the anode of diode D19 and system common ground 70 can be varied. Current through the resistive element R7 from source V1 charges capacitive element C2 until the capacitive element C2 is charged to a voltage sufficient to breakdown Zener diode Z1. When Zener diode Z1 breaks down, the voltage on the lower terminal of the differential amplifier AIC9 is maintained at a fixed voltage regardless of the voltage across the capacitive element C15. This voltage is also provided to the resistive element R10 which is a potentiometer. The wiper of the potentiometer R10 is adjustable to set the voltage on the low or fixed voltage reference terminal of the integrated circuit differential amplifier AIC10 to a fixed value which may be similar to the value of the reference voltage terminal of the previously described differential amplifier AIC9. Capacitive element C1 is useful for preventing transient increases in voltage across the signal terminal of the differential amplifier AIC9. Resistive element R8 is a feedback resistive element. Resistive element R6 does not normally effect the operation of the circuit unless the switch CLP for coldload protection is closed. At that point the sensitivity of the input circuit to the differential amplifier AIC9 is decreased due to the fact that the current through resistive element R4 may also flow through resistive element R6 in addition to resistive element R5. Consequently, the net input impedance of the input circuit for the differential amplifier AIC9 is decreased and the voltage divider value formed by the resistive elements R4, R5 and R6 is sufficient to provide actuation of the output terminal of the amplifier AIC9 only with a substanially higher voltage output from the bridge circuit D7 through 10. This of course corresponds to a significantly higher increase in current flowing in the line 24. It has been found that when a circuit breaker is closed on a line to connect a power source with a dead line or circuit, the surge of current between circuits through the main contacts of the circuit breaker, which is sensed by the current transformer of the protective system 18 is sufficiently high to cause, in some instances, actuation of the recloser static control to cause the circuit breaker to open when an opening in fact is not needed. This is becausue of the transient influence of the current flowing into the dead or cold network. The coldload protection CLP switch therefore desensitizes the control system for the recloser for a short period of time until the transients have died away.

The wiper on resistive element R5 is adjusted to cause the output terminal of the differential amplifier AIC9 to be energized or provide a signal when a minimum trip current has been exceeded in the conductor 24. Under these conditions the output of transformer AIC9 will change from −0.6 volts in this embodiment of the invention to approximately +15 volts direct current. It may simply be stated that the output of the amplifier changes from a "0" to "1" logic state. When the output of the differential amplifier AIC9 goes to its lower or 0 value, the diode D20 will conduct electrical current from the common bus 70 into the output terminal of the amplifier AIC9 and regulate the voltage at that terminal to approximately −0.6 volts, that voltage being the usual voltage drop across a silicon diode such as diode D20. It can be seen then that the amplifier AIC9 acts as a disabling means for signals at diode 21 from other parts of the control circuitry which signals would control or energize the second amplifier AIC10 if left ungrounded or disabled by the action of the minimum trip circuit amplifier AIC9. However, when the current flowing through the line 24 as shown in FIG. 3 exceeds the minimum trip value as determined by the resistive element R5, amplifier AIC9 will be actuated to produce a relatively high output signal. This will cause reversed biasing of the diode D20, D21 and D24. Since the previously described input signal lines from other portions of the circuit are connected to the other side of diode 22 in each case by a diode 23 for one of the signal leads and by a diode 25 for the other signal leads, it can be readily seen that when the output terminal of the amplifier AIC9 is in the high state or digital 1 state, the voltage on either side of diode D22 must be equal and generally constant. Subsequently, diode D22 is reversed bias. This means that any signals which were on the previously described input circuit lines from other portions of the circuit are free to actuate amplifier AIC10.

It can also be seen that the output of the amplifier AIC9 is connected by way of lead 106 to the input terminal of an inverter IIC4a. When a digital 0 exists on the input to that inverter, a digital 1 exists on its output terminal and consequently the timing capacitors C22 and C23 are prevented from discharging. Conversely, if a digital 1 exists on the input of the inverter IIC4a, a binary 0 or low voltage state exists on its output and the capacitive of timing elements C22 and C23 may be discharged in accordance with the operating characteristics of the reset timer the complete function of which will be described later hereafter.

The voltage across the capacitive element C15 is provided additionally to other parts of the circuit recloser control system. The voltage signal is supplied by way of line 74 to the previously described time delay circuit from whence output signals may be provided on the previously described lines connected to the anodes of diodes 21 and 25 for use in actuating the integrated circuit differential amplifier AIC10. The signal from line 74 is applied simultaneously to two matrix diode circuits 74 and 78. The outputs from these circuits are supplied respectively on lines 80 and 82 to deck a contact positions 1 and 2 of the switch PTDC. The second contact position of deck a of the previously described switch is electrically connected to the first contact position of deck b. The second contact position of deck B is not unconnected to anything. The wiper of deck b is connected to ground or system common 70 as previously described. Consequently, if the PTDC switch is in the 1 contact position, the second contact position is grounded through deck b and the signal from line 80 is provided through the wiper of deck A to a line 84, to a capacitive timing network 86 on the phase time card PTC. The output of capacitor function block 86 is connected to a line 88 which is one of the previously described input lines to differential amplifier AIC10. Line 88 is connected to the previously described anode of the diode D24. If the PTDC switch is placed in the second contact position, the output from functional block 78 is provided through line 82 to the wiper of deck a and from thence to the line 84. In either case the output from either diode matrix 76 or diode matrix 78 provides an input signal by way of timing capacitor functional block 86 to the differential amplifier AIC10 through diode D23. Matrix blocks 76 or 78 are chosen to provide different relatively long time delays for supplying a signal on either line 80 or 82 respectively after a certain predetermined voltage is reached at the capacitor C15. This means that the level detector amplifier AIC10 will be energized by the signal across capacitive element C15 by either of two preselected time delays corresponding to the positions of the PTDC switch if a minimum trip current is flowing in the line 24 as ascertained by the presence of a digital 1 or enabling signal on the output terminal of the amplifier AIC9.

The output voltage across the capacitive element C15 is also connected by way of link 92 to electrical conductor or lead 90 which is connected to the wiper or common input terminal 4 of deck a of the PCI switch generally designated PHASE CURVES INST. in FIG. 1. The PCI switch may be controlled to supply the information from contact position 4 to either of three other contact positions 1, 2 or 3. A lead from contact 1 goes to a diode matrix 94, a lead from contact 2 goes to diode matrix 96 and a lead from contact 3 goes to diode matrix 98. Diode matrix elements 94, 96 and 98 provide significantly shorter time delays than the counterpart time delays 76 and 78 as previously described. Output lines 100, 102 and 104 from diode matrix time delay circuits 94, 96, 98 respectively are connected to the contact terminals 1, 2 and 3 respectively of the b deck of the PCI switch. The wiper is connected to any one of these three contact positions depending upon the setting of the PCI switch. The wiper is connected by way of line 105 to the anode of the previously described diode D25. The signal on line 105 will energize amplifier AIC10 in a manner similar to the signal on line 88 as previously discussed. By presetting the PCI or PHASE CURVES INST. switch to any of the three previously described contact positions any one of the time delays programmed on diode matrixs 94, 96, or 98 may be chosen to provide an input signal to the amplifier AIC10 at a relatively short time after that signal has been impressed across the capacitive element C15, which time is significantly shorter than the time a signal from line 88 would be impressed across the input terminal to the amplifier AIC10.

Consequently, it can be seen that, provided the output terminal of the amplifier AIC9 is in the enabling state, amplifier AIC10 will be energized in a relatively short period time depending upon the setting of the PCI switch and only when the fourth contact position or wiper of deck B of the PCI switch is disabled by a signal on line 107 as will be described later and then will a signal from either of the two previously described relatively long time delayed diode matrixes 76 and 78 be provided to the input terminal of the amplifier AIC10 as previously described. Said in another way, a signal will be provided by the output terminal of the amplifier AIC10 a relatively short time after an overload is sensed in the conductor 24 for as many successive reclosings of the circuit breaker contacts as the selector switch PCI indicates. After which a signal will be provided at the same terminal a relatively long time after an overload is sensed after a prior reclosing. The short time delay signal is preselected by picking one of the three selector positions of the PHASE CURVES INST. switch. The long time delay signal in predetermined by picking one of the two selector positions of the T.D. switch PTDC and the change over from relatively short time delays to relatively long time delays during a series of openings and reclosings is chosen by a preselection of one of the selector positions of the PHASE INSTANT trip or PIT switch the operation of which will be described hereafter.

One input terminal each of the NAND GATES NIC1a, NIC1b, NIC1c and NIC2a is connected to a digital 1 or analog voltage value V1 by way of the resistive elements R78, R79, R80 and R81, respectively. Each of the previously described input gates has connected thereto a line which is connected at the other end thereof to one of the five positions of the PHASE INSTANT TRIP selector switch PIT as shown in FIG. 1. The constant corresponding to the 0 position on the PHASE INSTANT TRIP or PIT selector is connected to the previously described input terminal of the NIC1a gate. In a like manner the contacts for the 1 position is connected to an input terminal of the NIC1b gate, the contact terminal for the 2 positions is connected to an input terminal of the NIC1c gate and finally the contact for the 3 position is connected to the input terminal of the NIC2a gate. There is no electrical lead connected to the contact for the fourth position of the PIT switch. The wiper of the PIT or PHASE INSTANT TRIP switch is connected to ground. Consequently, if the PHASE INSTANT TRIPS selector is set in the 0 position, the NIC1a gate will have a digital 0 placed on one input terminal thereof and consequently regardless of the status of any of the other input terminals for that gate the output terminal will always register a digital 1 in accordance with well known principles of logic design. In addition, those input terminals connected to resistors R79, R80 and R81 will be grounded by the actions of the diodes D54, D55 and D56. Consequently, all gates NIC1a, NIC1b, NIC1c, and NIC2a will have digital one's on their outputs. Since all of these outputs are connected to one input of the NIC4c NAND GATE, that input terminal will always be in the 1 state and consequently, the output terminal of the NIC4c gate will be 0 regardless of the status of any other inputs to the previously described four gates. If the output terminal of the NIC4c gate is 0, the previously described wiper of the B deck of the PCI or PHASE CURVES INST. switch will be disabled or grounded. If this happens, the relatively long time delays between sensing of overload of fault current and the production of a corresponding digital 1 signal at the output terminal of the AIC10 differential amplifier will be delayed by either of the two relatively delayed diode matrixes 76 and 78 in the manner previously described. In generally as long as a digital 0 exists on the output terminal of the NIC4c gate, the output of the PCI switch will be disabled and the operation of the relatively long time delayed diode matrixes 76 and 78 will prevail. A digital 0 may be placed on the output terminal of the NIC4c gate in the manner previously described. As a further example presume that the PIT selector switch has been changed to the 3 position, in this case the input terminal of the NIC1c gate which is also connected to one end of the R80 resistor will be grounded through the wiper of the PIT switch. In addition, the input terminal of the NIC2a gate will also be grounded through the diode D59. However, the input terminals of the NIC1a gate connected to resistor R78 and the NIC1b connected to resistor R79 will remain in the digital 1 state due to the actions of the voltage V1 upon the resistive elements R78 and R79 respectively. The NIC1a gate and the NIC1b gate will produce digital 1 outputs at their respective output terminals unless all the input terminals to the NIC1a gate and the NIC1b gate are in the 1 state. It will be shown hereafter that none of the input terminals to any of the gates can all be in the 1 state for more than one gate at a time. However, depending upon the status of the counter, which will be described hereafter, one of the gates may have digital 1's on all of its input terminals. In the early stages of the reclosing duty cycle, the input lines to the gate NIC1a will have digital 1's thereon and the output terminal thereof will be at 0. The strong influence of a 0 on all the other gates of the counter will cause the output of gate NIC1a to be dragged down to a 0 level causing the uppermost input terminal of the NIC4c gate to go to 0, consequently causing a digital 1 or enabling output signal at the output terminal of the NIC4c gate. When this happens, the fast time delayed output signals from any of the chosen diode matrix networks 94, 96 and 98 will provide a signal through line 105 to the input terminal of amplifier AIC10. The same operation will occur with respect to the NAND GATE NIC1b when the count of the counter has changed in the response to a reclosing of a circuit breaker after a previous opening. Once again the output terminal of the NIC4c gate will be a digital 1 and consequently a second application of signal through line 105 will provided to the gate AIC10 if the recloser contacts have closed on a fault which has not been cleared. It is not until the counter has indexed to a state to enable NIC1c that the status of the NIC4c terminal will change from that of a 1 to a 0 thus disabling the relatively quick time delayed and causing the relatively slow time delays of the diode matrix 74 or 78 to prevail. If the wiper of the PIC switch was placed in the 4 position, it would be possible for each of the gates NIC1a, NIC1b, NIC1c and NIC2a to, have a digital 0 on the output terminals thereof. In addition, because the lines to the other input terminals of each of the gate is interconnected with the counter, at least one of the gates must have digital 1's on the input terminals thereof after each reclosing this means that that gate has a 0 on the output terminal thereof. A 0 of the output terminal of any of the four previously described gates will cause a 0 to be put on the upper input terminal of the NIC4c gate and consequently a 1 to be put on the output terminal thereof. The ultimate result of this is that none of the relatively long time delays caused by the diode matrixes 76 and 78 operating upon the input signal from the capacitor C15 will prevail. This in turn means that all of the reclosing operations in the duty cycle will be done with relatively high speed or almost instantly after the sensing of a fault on the line to be protected.

With regard to the lower input terminal to the NIC4c gate it can be seen that this terminal is connected to a wiper of the switch OSTLO otherwise known as the ONE SHOT TO LOCKOUT toggle switch shown in FIG. 1. If the wiper of this switch is depressed to the low position, the lower input terminal of the NIC4c gate is grounded or impressed there upon with a digital 0 level. Consequently, regardless of the status of the upper input terminal, the output terminal of the latter mentioned gate will be a digital 1. Such being the case gate AIC10 will provide a digital 1 signal of the output terminal thereof after a relatively short time or said in another way almost instantaneously after the sensing of overload current in the line 24.

It can be seen that the digital 1 signal, which causes opening of the circuit breaker, is produced at the output terminal of the AIC10 integrated circuit differential amplifier as a function of the amount of current flowing in the line to be protected, the settings of the potentiometers R5 and R10, the settings of the switches PCI, T.D. and PIT, and the state of the counter which will be described later hereafter. The capacitive elements C3 and C4 which are connected to the low and high input terminals of the differential amplifier AIC10 as well as the capacitive elements C5 and C6 which are connected to power supply terminals Z1 and Z3 respectively of the amplifier AIC10 are provided for the suppression of transient noise signals. Resistive element R11 is a feedback resistence which performs the same function as resistive element R8 with respect to amplifier AIC9. Diode D26 provides a direct path to the ground or system common bus 70 for a low output of amplifier AIC10.

The output of the amplifier AIC10 is connected to the base of a transistor Q1. Transistor Q1 in this embodiment of the invention is a NPN transistor. If the output of the amplifier AIC10 is at a digital 1 state or relatively high voltage state, the base to emitter junction of the transistor Q1 is forward biased and transistor Q1 saturates or acts as if it were a switch in the "ON" state. Consequently, electrical current flows from the voltage source V1 through the emitter resistor R12 to the gate of a silicon control rectifier or similar means Q2; which will trigger gate Q2 to the ON or conducting state. Capacitive element C7 is for voltage suppression. As was mentioned previously if the separable main contacts of the circuit breaker or interrupter are closed, the auxiliary contacts R52al are also closed. Consequently, the turning on of silicon control rectifier Q2 provides a direct current path for the trip coil TC from the bridge power supply network D30 through D33. Energization of the trip coil TC causes tripping of the circuit breaker in a conventional manner. The energization of trip coil TC is accomplished primarily by the discharging of a capacitor C9 which had been previously charged as will be described hereafter through a diode D27 into the upper end of the trip coil TC. The resistive element R14 provides a shunt path for current so that the voltage present at the upper end of the trip coil TC, when auxiliary contact R52al opens, will be applied to the anode of silicon controlled rectifier Q2 in a controlled manner by the action of resistance means R14 and the capacitor C8 rather than abruptly upon the subsequent closing of contact R52al. Capacitive element C8 acts as a noise suppression element for the anode to cathode circuit of the silicon control rectifier Q2. In addition, capacitive element C8 is charged to essentially the same voltage as the voltage drop across the storage capacitor C9. Consequently, if the test pushbutton TPB is depressed, current will flow from both resistive element R14 and capacitive element C8 through resistor R13, which is a current limiting resistor, through the closed test pushbutton TPB to the gates of the silicon control rectifier Q2 to energize the silicon control rectifier Q2 or put it in ON state thus providing electrical current through the trip TC to test the operation of the circuit breaker. In those circumstances when the capacitive element C9 has been discharged to an insufficient level to energize trip coil TC, the necessary energy may be drawn from the bridge rectifier network D30 through D33 as previously described through diode D28 and resistive element R15. The capacitive element C9 is charged rather rapidly from the bridge rectifier network D30 through D33 through the previously mentioned diode D28 and resistive element R16.

During long periods of control circuit inactivity, capacitive element C9 may slowly discharge to a point where the energy stored therein is insufficient to initially energize trip coil TC, such being the case it would be desirable to anticipate this status of capacitor C9 and provide a failsafe circuit for tripping the circuit breaker prior to this period. The circuit including the unijunction transistor Q3 is provided for that purpose. The anode A of the unijunction transistor Q3 is maintained at a relative constant voltage by initially charging capacitive element C12 through the diode D29 and resistive element R22 from the bridge network D30 through D33. The voltage on the anode is regulated by the Zener Z2. Capacitive element C9 slowly discharges through resistive elements R16 through R20 and R22 until the voltage drop on the gate G of Q3 is less than the voltage drop across the Zener diode Z2. When this occurs Q3 is placed in the conductive state. The voltage divider comprising resistive elements R16 through R19 provide a means for accomplishing this purpose. Since the gate G of the silicon rectifier Q3 is connected to the junction point between the resistive elements R18 and R19, unijunction transistor Q3 will conduct when the voltage across resistive element R19 becomes sufficiently less than the voltage on the anode A of the unijunction transistor Q3. When this occurs current is provided across the resistive element R21 the upper end of which is connected in circuit relationship with the gate of the silicon control rectifier Q2. The increase in the flow of current through the resistive R21 causes an increase in voltage on the gate of the silicon control rectifier Q2 thus actuating it to a conducting state thus causing the trip coil TC to be energized by the remaining electrical energy stored in a capacitive element C9. Resistive element R20 provides a high impedance discharge path for the previously described capacitive elements C9 and C10 when the diode 28 is reversed biased. Also connected across the output terminals of the bridge rectifier network D30 through D33 is the series combination of a silicon control rectifier Q4 and auxiliary contacts R52b1. The auxiliary contacts R52b1 as was previously described are closed when the circuit breaker is open and the combination the closed auxiliary contacts R52b1 and the conducting silicon control rectifier Q4 provide a low impedance path between the cathode of diode D30 and the anode of diode D32 thus allowing sufficient electrical energy to flow through the closing motor CM to close the separable main contacts of the circuit breaker. Silicon control rectifier Q4 is only energized when a closing or reclosing of the separable main contacts is desired. It is generally controlled by the reclose timing circuit the operation of which will be described hereafter.

By referring again to FIG. 2, it can be seen that contact position circuit CP provides output signals for triggering the reset timer portion of the reset circuit 48, enabling the decoder 50 and indexing the counter 52. By referring again to FIG. 3 the contact position circuit CP is shown schematically, that circuit comprises an auxiliary contact R52b2, an indicating lamp T1, diodes D47 and D48, capacitive element C20 and resistive element or resistor R54. The relay R52b2 indicates the status of the main contacts of the circuit and initiate the output signals from the contact position circuit CP. When the separable main contacts of the circuit breaker are open, the auxiliary contacts R52b2 are closed thus providing a path for current from the source V1 through the indicating lamp T2 to ground or system common this illuminates the lamp T1 indicating that the separable main contacts of the circuit breaker are open or said in another way that the circuit breaker has tripped. This lamp is identified in FIG. 1 as the TRIPPED indicating lamp. The closing of the relay R52b2 disables the reset timer by short circuiting or grounding any signal which may be present at the output terminal of the inverter IIC4a. Consequently, should a digital 1 be present for any reason at the output terminal of the inverter IIC4a the closing of auxiliary contacts R52b2 will defeat that signal and prevent it from being provided to the reset timer. The operation whereby this is accomplished will be described hereafter. Simultaneously, the closing of contact R52b2 places the input terminal to the inverter IIC2b at a digital 0. If the contact R52b 2 were open, the voltage source V1 and the resistive element R54 would provide a digital 1 to the input terminal of the inverter IIC2b. The capacitive element C20 connected between the input terminal to the last mentioned inverter and ground provides a means for spurious noise rejection and for storing energy for maintaining the input terminals of the inverter IIC2b in the 1 state when the diode D48 is reversed biased. Inverter IIC2b acts as an enabling means for the NAND GATES NIC3a, NIC3b, NIC3c, and NIC2c. The other input signals for the last mentioned NAND GATES come from the counter to be described hereafter. The interconnection between the last mentioned NAND GATES and the counter are such that only one of the last mentioned gates at a time can have a digital 1 output signal impressed thereon. The last mentioned NAND GATES comprise the input devices for the decoder 50 shown in FIG. 2.

The counter 52 shown in FIG. 2 comprises an indexing means for other parts of the recloser control systems. The counter comprises two integrated circuit bistable multi-vibrators generally designated MIC7A and MIC8B each integrated circuit bistable multi-vibrator or flip flop has a set trigger S, a reset trigger R, a clock trigger actuatable only on the change of a digital input from digital 1 to digital 0 designated $\overline{C}$, a set $S$, a reset $R$, a set output A and a reset output $\overline{A}$, in the case of the second integrated bistable multivibrator MIC8B, the set output is designated B and the reset output is designated $\overline{B}$. The set and reset of both the previously mentioned bistable multi-vibrator are actuated by a digital change from 1 to 0. Initially, the binary counter is in the 0—0 state. That means that the set output A of the first bistable multi-vibrator MIC7A is at a digital 0 level, and the set output B of the second bistable multivibrator MIC8B is also at a 0 a digital level. Such being the case the reset outputs $\overline{A}$ and $\overline{B}$ respectively are at the 1 digital output level. This is the status of the counter immediately prior to the sensing of a fault on the line to be protected. It will be noted that the most of the previously mentioned bistable multi-vibrators employ electrical connections between the set output and reset trigger thereof and the reset output and set trigger thereof. The purpose for this electrical interconnection is well known in the art and will not be described. When the binary counter is in the 0—0 state, the reset output from the first bistable multivibrator MIC7A provides a digital 1 to the uppermost input terminal of the previously described NAND GATE NIC3a and concurrently provides a 1 input to the uppermost input terminals of the NIC1a and NIC1c NAND GATES of the previously described phase instantaneous trip control PIT shown as 62 in FIG. 2. The set output B of the second bistable multivibrator provides a digital 0 r disabling signal to the middle input terminals of the NIC3c and NIC2c NAND GATES of the decoder 50 and the NIC1c and NIC2a NAND GATES of the phase instantaneous trip control 62. The reset output $\overline{B}$ of the second bistable multi-vibrator MIC8B provides a digital 1 to the lowermost input terminals of the NIC3a and NIC3b NAND GATES of the decoder 50 and the middle input terminals of the NIC1a and NIC1b NAND GATES of the phase instantaneous trip control PIT. In addition, the previously described reset output signal $\overline{A}$ of the first bistable multivibrator MIC7A is provided to an inverter IIC5a. Since the input terminals to the inverter are at a binary 1, the output terminal will be at a binary 0. This binary 0 is provided to the uppermost input terminal of a NAND GATE NIC6b for providing a clock signal to the counter and to the uppermost input terminals of the NAND GATES NIC1b and NIC2a of the phase instantaneous trip control circuit PIT. The latter mentioned output signals from the inverter IIC5a which is a digital 0 is also provided to the uppermost input terminals of the NAND GATES NIC3b and NIC2b of the decoder 50. The net result of the counter being in the 0—0 state is to provide two digital 1 input signals to the top and middle input terminals of the NIC1a NAND GATE of the phase instantaneous trip control 62 so that if the PHASE INSTANT TRIP selector switch is placed in the 0 position, the last mentioned gates will have 1's on every input terminals thereof and thus provide a 0 output. The use of a 0 output on the NIC1a NAND GATE has previously been described. If the PHASE INSTANT TRIPS selector is not in a 0 position, the output of the NIC1a gate will remain 1. Another result of the counter being in the 0—0 state is the enabling of the NIC3a NAND GATE of the decoder 50. Said another way the uppermost and middle input terminals for the latter mentioned NAND GATE have a binary 1 thereon. Consequently, when the previously described auxiliary contact R52b1 closes on the opening of the main contacts of the circuit breaker providing a digital 1 to the last of the three input terminals to the NIC38 NAND GATE, the output from that NAND GATE will shift from binary 1 to binary 0. This will provide a binary 0 at the input terminal of the inverter IIC4d. The output terminal of the latter mentioned inverter will change from the digital 0 state to the digital 1 state. This will remove the ground from the anode of the diode D49. Consequently, the reclose timing capacitor C21 will charge from the voltage source V1 at the upper end of resistive element R55 through the resistive element R55, the diode D49 the wiper of the first deck of the reclose time switch RT, through the terminal which that wiper contacts, through resistive element R60 to charge the capacitive element C21. The reclose trigger circuit 58 which includes as part thereof the reclose timing capacitor C21 is arranged such that the transistor Q7 turned off. Consequently, transistor Q8 is also maintained in the OFF position by the action of the resistive element R74 and the voltage V1. Such being the case, the junction point between the resistive elements R76 and R77 is virtually at 0 volts. Since this junction is connected to the gate of the silicon control rectifier Q4, Q4 will remain nonconducting. Consequently, the closing motor will not be energized to close the circuit breaker. However, the charging of the reclose timing capacitor C21 in the manner previously described will, according to the time constant of the charging circuit, eventually cause the Zener diode Z10 to break down thus applying sufficient current to the resistor R73 to increase the voltage drop thereacross and forward bias the base emitter circuit of the transistor Q7. When this happens, transistor Q7 will conduct providing a current path from voltage source V1 through resistors R74 and R75 and the conducting transistor Q7. This drops the voltage on the base of the transistor Q8 to a value sufficient to that base to emitter junction to be forward biased causing the transistor to conduct. when the transistor conducts, the voltage from the voltage source V1 flows through the conducting transistor Q8 and the voltage divider resistors R76 and R77 thus increasing the voltage at the junction between the two last mentioned resistors. When this occurs, the increase in voltage from across the resistor R77 is sufficient to provide a gate pulse to the silicon control rectifier Q4 causing it to conduct thus energizing the closing motor of the circuit breaker and causing the separable main contacts to close. When this happens, the auxiliary contacts R52*b*1 and R52*b*2 open and the auxiliary contacts R52*a*1 and R52*a*2 close. The opening of auxiliary contact R52*b*1 interrupts the closing motor energizing circuit and prevents anode current from flowing to the silicon control rectifier Q4 thus turning it off. The opening of the auxiliary contact R52*b*2 removes the disabling binary 0 from the output terminal of the inverter IIC4*a* thus allowing the timing capacitors C22 and C23 of the reset timer of the reset circuit 48 to begin to charge to thereby attempt to initiate a reset of the counter. The reset timing cycle will be disabled immediately if the inverter output terminal switches from a binary 1 to a binary 0 or if the auxiliary contact R52*b*2 closes once again. The former will happen if a fault is once again detected by the current transformer CT1 and the latter will happen if the circuit breaker reopens as was subsequently described.

When the main contacts of the circuit breaker close and the fault is no longer present on the line 24 to be protected, the binary 0 will appear on line 106 and the output terminal of the inverter IIC4*a* will be at a binary 1 position and remain there since the auxiliary contact R52*b*2 must remain open if the circuit breaker main contacts remain closed. As soon as the binary 1 appears on the output terminal of the inverter IIC4*a*, the reset timer will begin to time out according to the setting of the selector RT. Since the high sides of the capacitive elements C22 and C23 are not short circuited by a binary 0 on the output of the inverter IIC4*a*, they will begin to charge through one of the resistive elements R65 through R68 from the voltage V1. When the voltage across the capacitive elements C22 and C23 exceeds the Zener break down voltage of the Zener diode Z9, the transistor Q6 will conduct. Consequently, the voltage on the reset line 110 will change from a digital 1 level generally corresponding to voltage V1 to a digital 0 level. As was mentioned previously the reset terminals of the bistable multi-vibrators MIC7A and MIC8B are responsive to changes from the binary 1 to the binary 0 level. And consequently, the latter mentioned bistable multi-vibrators will be reset to the initial or 0—0 state. In addition, a digital 0 on the input terminal of the NAND GATE NIC6d will provide a digital 1 at the output terminal thereof regardless of the status of the other input terminals of the latter mentioned NAND GATE. If the output of the NAND GATE NIC6d was already 1, nothing will happen, if it was 0, it will change to 1. And since this output is connected to the SET input terminals $\overline{S}$ of the last mentioned multi-vibrators and since these inputs only respond to changes from 1 to 0, the last mentioned multi-vibrators will not be set which is consistent with them being reset. The binary 0 from the transistor Q6, will also be placed on the lowermost terminal of the NAND GATE NIC6*a* providing a digital 1 on the output terminal thereof which is connected to the output terminal of the previously described NAND GATE NIC6d When the auxiliary contact R52*b*2 open after the closing of the main contacts, the output terminal of the inverter IIC2*b* change from a digital 1 to a digital 0. The digital 0 is fed through the now forward biased diode D60 to the clock input terminal $\overline{C}$ of the first bistable multi-vibrator MIC7A as was described previously, a clock pulse which goes from a binary 1 to a binary 0 will cause a change in state in the multi-vibrator numerically upward. In addition the reclosing timing capacitor C21 is quickly discharged through the forward biased diode D62 and resistive element R83. This means that the reclose timing cycle may be begun anew on the next or subsequent opening of the separable main contacts. It should be noted that the binary 0 on the clock input of the first bistable multi-vibrator MIC7A overrides a digital 1 which may at times be present on the output terminal of the NAND GATE NIC6*b*. The change in state of the output terminal of the IIC2*b* gate from 1 to 0 causes the set A and reset $\overline{A}$ output terminals of the bistable multi-vibrator MIC7A to reverse polarities. This causes the output of the IIC5*b* inverter to go from 1 to 0. However, this will have no effect on the clock input $\overline{C}$ of the second multi-vibrator MIC8B because it already is at 0. Also, the output of the IIC5*d* gate will go from 1 to 0. However, because of the presence of the capacitive element C29 which must be discharged by the change in polarity of the output terminal of the inverter IIC5*d*, the input terminal of the inverter IIC5*d* is not effected until the capacitor is completely discharged. When it is completely charged, the output terminal of the inverter IIC5c would change from 0 to 1, but IIC5b overrides with an 0 output. Consequently, MIC8B remains in the 0 state. This course of events will enable the NAND GATE NIC3b of the decoder and the NAND GATE NIC1b of the phase instantaneous trip control PIT. If the separable main contacts of the circuit breaker would have reclosed upon a faulty line 24, the circuit interrupter would be tripped again with a time delay depending upon the setting of the PHASE INSTANT CURVES selector switch PCI and the PHASE INSTANT TRIP CONTROL PIT. Any previously begun reset timing cycle will be immediately stopped by the presence of the digital 1 on line 106 and by the closing of the separable auxiliary contacts R52b2. The timing capacitors C22 and C23 will be quickly discharged. The NAND GATE NIC3b will be enabled and the output thereof will change to a digital 0 thus initiating the reclose time cycle as determined by the setting of the second switch of the reclose time control. After an appropriate time time delay determined by the charging of the reclose time capacitor C21 through the resistive elements R56 and that resistive element of the four resistive elements R60 through R63 which has been chosen previously by the settings of the second deck of the switch of the RECLOSE TIME switch shown in FIG. 1. The gate of the silicon control rectifier Q4 will be energized to cause the closing motor CM to once again reclose the circuit recloser or circuit interrupter main contacts. When this happens auxiliary contact R52b2 will open causing the output of the inverter IIC2b to change from a digital 1 to a digital 0. The last mentioned change in the output of the inverter IIC2b will cause a indexing of the first multi-vibrator MIC7A to thereby change its state it will also cause disabling of the reclose circuitry and will discharge the reclose capacitor C21. When the set output of the bistable multi-vibrator MIC7A changes from a A binary 1 to a binary 0, the output of the inverter IIC5b will change from a binary 0 to a binary 1. Since the output of the inverter IIC5c was already at a binary 1 from the previous indexing of the counter, the input to the clock terminal $\overline{C}$ will change to a binary 1. However, the presence of the binary 0 on the input terminal of the inverter IIC5d will cause a binary 1 to to exist on the output terminal thereof, this will cause a charging of capacitive element C29 to a binary 1 state after a short time delay. It is after this short time delay that the input to the inverter IIC5c changes to a binary 1 and when that happens, the output thereof changes to 0. Because of the controlling influence of a binary 0 when compared to a binary 1, the input to the clock $\overline{C}$ terminal of the multi-vibrator MIC8B will change from a binary 1 to a binary 0 state which is sufficient to index that multi-vibrator. The state of the multi-vibrators MIC7A and MIC8B are such that the decoder NAND GATE IIC3c and the phase instantaneous trip control NAND GATE IIC1c are now enabled for a subsequent operation in the duty cycle of the circuit recloser. If the reclosers separable main contacts close upon a faulty line 24, the operation will continue in the same manner as previously described causing subsequent time delayed opening of the circuit breaker and further time delayed reclosing thereof until the number of subsequent openings before a reset has reached the preprogrammed number on the TRIPS TO LOCKOUT selector switch as shown in FIG. 1. When this occurs, a binary 0 is placed on the uppermost input terminal of the NIC6c NAND GATE which puts a binary 1 on the output terminal thereof. The binary 1 is then supplied to the uppermost input terminal of the NIC6A NAND GATE and if the input to the lower terminal is also a binary 1 which will be the case since the reset timer cannot cause a reset faster than the inputs can be applied to these latter mentioned signals, a binary 0 will be put on the output terminals of the NAND GATE NIC6a. This change in the state of the latter mentioned output signal from a binary 1 to a binary 0 will affect the set terminals S of the two previously described bistable multi-vibrator circuits MIC7A and MIC8B causing them to set to the 1 — 1 or lockout state. This will also cause the reclose timing capacitor C21 to be shorted out or prevented from charging by LOCKOUT GATE NIC6b. Consequently, the silicon control rectifier Q4 can no longer thereafter be energized to a conducting state and the closing motor CM cannot be energized. Because of the open circuit breaker and the 1 — 1 or lockout state, signals are provided from various predescribed circuit elements and counter elements to the inputs of the NAND GATE NIC2c which thereafter actuates a transistor Q5 to energize or illuminate a lamp LOI indicating that lockout has occurred.

In the event that it is desired to close the separable main contacts of the circuit breaker of the circuit reclosers system at any time whether during the duty cycle thereof or at any other time, this may be done manually by depressing the remote control manual toggle to the CLOSED position. This causes a substantial grounding of the left side of the capacitive element C25. Since voltage cannot change instantaneously across a capacitor the right side of the capacitive element C25 changes in voltage by an amount equal to the change in the left side. This change is fed through the Zener diode Z11 to the bottom of resistor R75. The bottom of resistor R75 then is essentially grounded for a short period of time. Consequently the voltage divider formed by the resistors R74 and R75 puts a relatively low voltage on the base of the transistor Q8 sufficient to cause it to conduct for a short period of time providing the necessary signal to the gate of the silicon control rectifier Q4 to actuate it to cause the closing motor CM to be energized to close the separable main contact. It will be noted that because of the charging characteristics of a capacitor, the transistor Q8 will not remain in the conducting state for a longer period of time than it takes the capacitor C25 to charge. Consequently, if the circuit breaker were to reopen again, it would not pump or reclose and reopen thereafter in a cyclic manner because the reclose timing circuit including the transistor Q8 would revert to a normal circuit breaker closing state. In order to cause a circuit breaker to close manually again, the previously described toggle switch would have to be removed from the closed contact and returned to once again energize the capacitor C25 in a proper manner.

Figure 4:
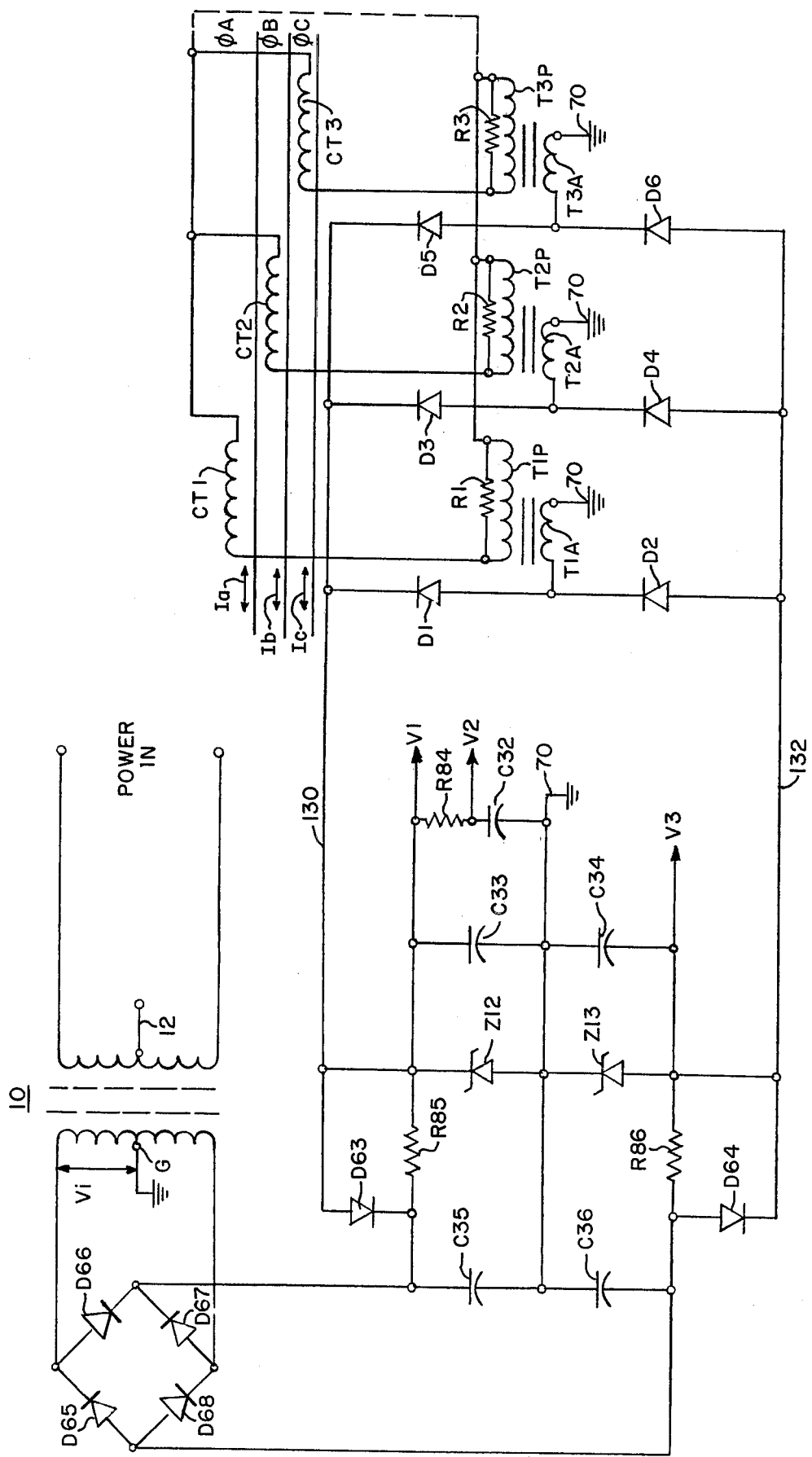
FIG. 4 is an enlarged circuit diagram of the control system power supply, line or phase current sensors, and interconnected potential transformers for supplying informational signals to the rest of the control system.

By referring now to FIG. 4, that portion of the circuit schematic diagram of FIG. 3 concerned with the power supply, the current sensor or sensors, and the potential transformer or transformers and the interconnection thereof for specific purposes is shown. The description and interconnection of the various circuit elements has been described previously with respect to Fig. Special notice should be given leads or conductors 130 and 132 whereby the power supply is interconnected with the current transformer and potential transformers. In this case it is specifically shown that a three phase line system comprising phase A A, phase B B and Phase C C in which currents Ia, Ib and Ic flow are monitored by three separate current transformers CT1, CT2, and CT3. Each of the current transformers CT1, CT2 and CT3 is connected in series circuit relationship with the parallel connections of the primary of a potential transformer T1P and resistor R1, T2P and R2, and T3P and R3, respectively. The auxiliary secondary windings of T1A, T2A and T3A, respectively of the three previously described transformer windings provide the means for interchanging power between the transformers and the power supply through the lines 130 and 132.

Figure 5A:
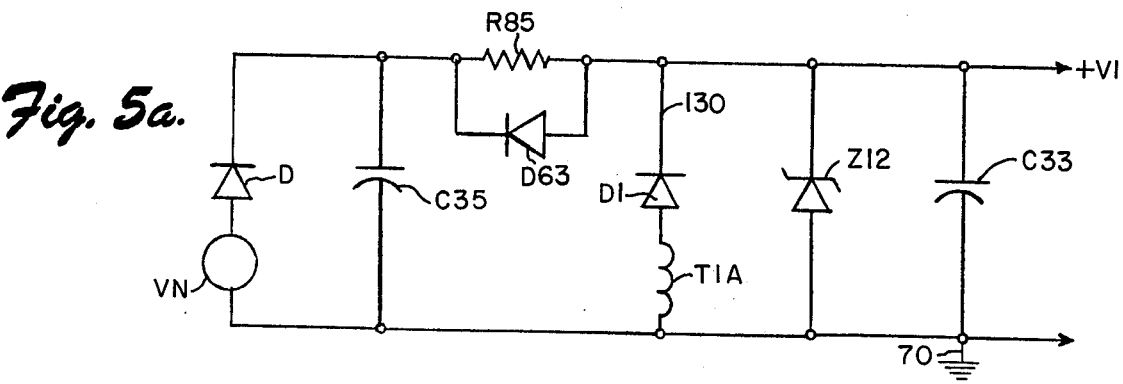
FIGS. 5a through 5d are schematic representations of portions of FIG. 4 which are presented for aid in analyzing the circuit operation of the elements of FIG. 4.

Referring now to FIG. 5A, the schematic diagram of FIG. 4 has been reduced and simplified for the purpose of analysis. The circuit of FIG. 5A has depicted therein the half-wave operation of the fullwave system. The capacitive elements C35 and C33 are easily identified by reference to FIG. 4 as is the Zener diode of regulating means Z12 and the output voltage terminal V1. The circuit comprising the resistive element R85 and diode D63 is redrawn to clarify their relationship with the other elements of the circuit. The diode D66 and D68 of the bridge D65 through D68 are shown as one diode generally designated D and the one-half wave voltage source generally designated VN as shown connected in series circuit relationship therewith. By referring to FIG. 5B, a further simplification of FIG. 5A is shown in which the capability of the auxiliary winding T1A to provide energy for voltage source V1 is depicted. Presume that the voltage source VN is no longer present either because it is short circuited or completely open circuited. The exact condition does not matter because the diode D will open if the voltage source VN is short circuited. The relationship between the capacitive element C35 and C33, the diode D1 and the diode D63, the resistive element R85, the Zener diode Z12 and the auxiliary coil T1A remain unchanged. Line 130 is also shown.

Figure 5B:
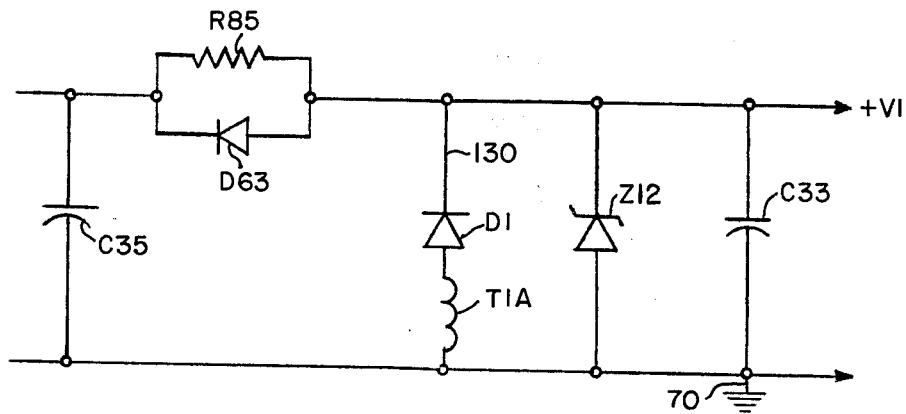
Figure 5C:
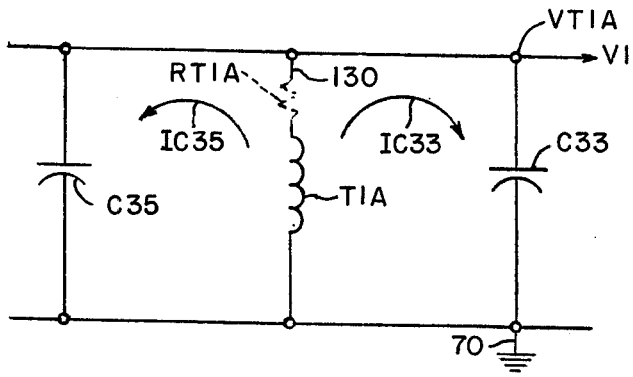

By referring to FIGS. 5C an even further simplification of FIG. 5B is shown. In this case it is presumed that the voltage value V1 begins to drop due to the fact that voltage source VN is no longer present. With such being the case Zener diode D12 becomes nonconducting and it is as if it were not in the circuit. In addition, diode D63 is forward biased and consequently it effectively short circuits resistive element R85. Finally, diode D1 is reverse biased and it essentially acts as a short circuit. Consquently, the voltage drop across the auxiliary coil T1A supplies currents IC35 and IC33 to the capacitive elements C35 and C33, respectively. It will be remembered that the voltage induced in the coil T1A is provided by the effect of current flowing in the current transformer CT1. The current is limited only by the internal resistence RT1A of the transformer auxiliary winding T1A. The voltage T1A may not be of sufficient magnitude to maintain the capacitive element C33 at a charge of V1 but it will maintain it at a charge VT1a which may be less than voltage V1 but which is nevertheless available for empowering the elements of the control system.

Figure 5D:
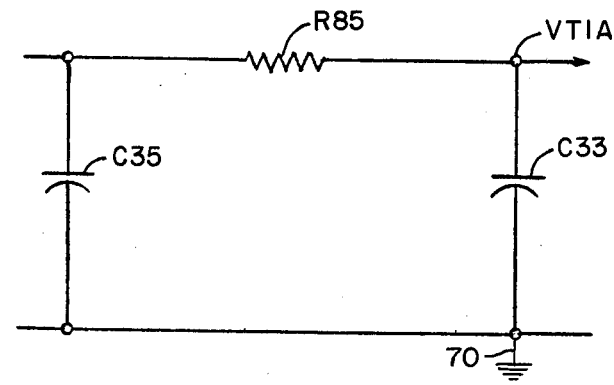

FIG. 5D shows an even more simplified version of the circuit shown in FIG. 5C where it is presumed that the voltage induced into the coil T1A is an alternating current voltage and it is that portion of the cycle of alternating current where the diode D1 is reversed bias because of the relative polarity and value of the voltage on either side thereof. It can be seen in this case that power is available to the circuit for empowering the elements therein at a value of VT1A which is the value of voltage stored across the capacitive element C33.

In summary, it can be seen by examining FIGS. 3, 4, and 5A through 5D that energy is available for providing power to the various elements of the recloser circuit control such as the integrated circuits and the transistors used therein, even though the main input terminals of the power supply may have been effectively shorted, such as might be the case if the terminals were connected to the line to be protected and a short circuit fault appeared thereacross.

Figure 6:
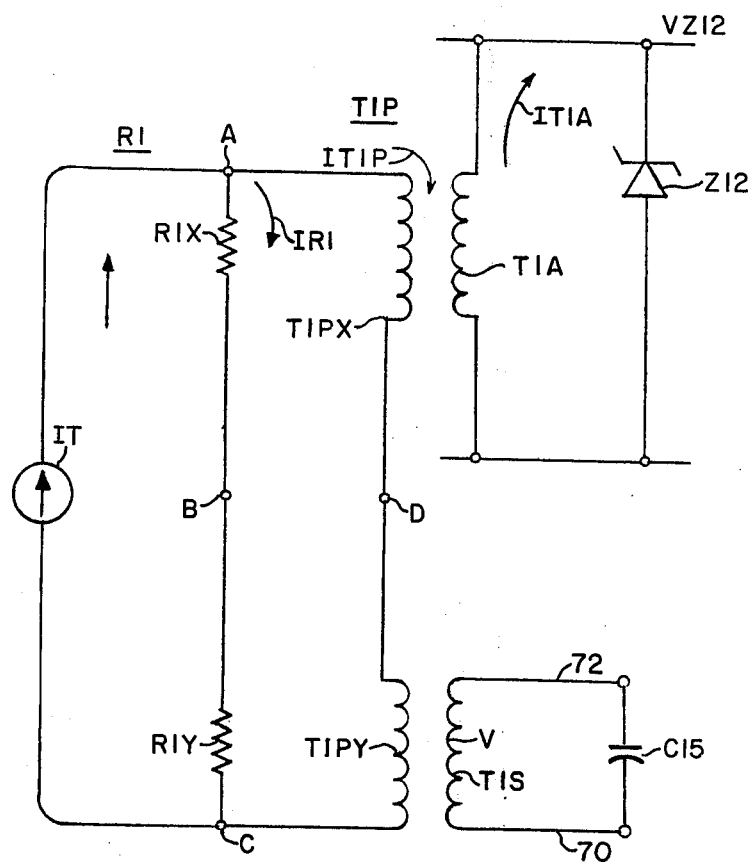
FIG. 6 is a schematic representation of a portion of FIG. 4 which is also useful for analyzing the circuit operation of FIG. 4.

By referring to FIGS. 3, 4 and 6, another aspect of the relationship of the power supply and the input current of potential transformers may be explained. In this case the current induced into the system by any or all of the current transformers CT1 through CT3 is/are represented by a current source IT. Presuming in this case that we are concerned exclusively with the current induced into the current transformer CT1 and its relationship with the potential transformer T1P. It can be seen that transformer T1P is connected in parallel circuit relationship across the current source IT. The potential dropping resistor R1 is also shown connected in parallel circuit relationship with the transformer T1P and current source IT. Both the transformer primary winding T1P and the potential resistor R1 are divided into two sections T1PX, T1PY and R1X, R1Y, respectively. Four points are identified on the input circuit designated as A, B, C and D. Points A and C are at either end of the parallel connections of the transformer T1P and resistor R1. Point B is between the resistive elements R1X and R1Y and point D is between the transformer primary windings T1PX and T1Py. Transformer winding T1PY is that portion of the overall transformer primary winding T1P which is available for supplying power to the secondary T1S of the transformer T1P. In a like manner, resistive element R1Y is that portion of the potential dropping resistor R1 which is monitored and measured by the primary winding T1PY. The remaining portion T1PX of the primary winding T1P is that portion which is available for supplying energy to the auxiliary winding T1A. Resistive element R1X is that portion of the overall potential resistor R1 which corresponds to the voltage drop across the transformer winding T1PX. In the configuration of FIG. 6 it is shown how the Zener diode Z12 and the power supply circuit acts to limit voltage V in that input circuit containing the capacitive element C15. It will be noted from previous discussions that capacitive element C15 provides a voltage signal for a minimum trip circuit such as 36 shown in FIG. 2 and the time delay program circuit 38 such as shown in FIG. 2. Both of these circuits contain voltage sensitive solid state devices which may be endangered by the presence of excessive voltage across the input terminals thereof. Consequently, it is desirable to limit the voltage V which may impressed across the capacitor C15 and thereby protect the voltage sensitive elements. The Zener diode Z12 is a key element in the circuit shown in FIG. 6 for limiting the voltage V. If the auxiliary winding T1A were not present, when the value of current IT became very large, that portion of the current IR1 which flowed through the resistive element R1Y would be reflected through primary winding portion T1PY into the secondary winding T1S to produce the voltage V. The larger the current IT became, the larger the voltage V would become. The larger the current IT became, the larger the voltage V would become with only the saturation of the iron core of transformer T1 acting to somewhat limit the magnitude and shorten the duty cycle of the voltage V. As can be easily seen, eventually the value of voltage V would exceed the critical breakdown values of the elements in the circuits connected to the winding T1S and those elements would break down or become destroyed under the stress of the voltage V. The placement of the auxiliary winding T1A prevents these damaging effects from occurring. In this case as the current IT increases that portion of the current IR1 flowing through resistive element R1X is reflected through the primary winding portion T1PX into the auxiliary winding T1A where it induces a current IT1A and a voltage VZ12 which is limited to the Zener diode voltage or regulating voltage of the Zener diode 12. Since the voltage VZ12 is held at a constant value, the voltage drop across resistive element R1X cannot increase above that value because the value VZ12 is reflected back through the windings T1A and T1PX to the resistive element R1X. If the voltage across the resistive element R1X cannot increase in value, it means that the current through IR1 must remain constant after the Zener diode voltage VZ12 is reached in the secondary circuit. However, as was previously described, the current IT may be exceedingly large because of the presence of a fault in the line to be protected. Since current IR1 cannot increase, the current IT1P which flows directly through the winding T1PX must increase to compensate for the difference. The current IT1P can increase in proportion to the increase of the current IT because the equivalent impedance of the winding T1TX is very low once the Zener diode breakdown voltage of the Zener diode Z12 is reached because the secondary current IT1A can flow relatively easily through the Zener diode Z12 even though the voltage thereacross remains clamped or fixed. Since the voltage IR1 remains constant because of the reasons previously described and since that current also flows through resistive element R1Y, the voltage drop reflected through the primary winding T1PY and secondary winding T1S to produce the secondary voltage V remains generally constant or clamped regardless of the amount of current IT being produced by a fault in the line being monitored, once the Zener diode voltage VZ12 is reached in that secondary circuit including the Zener diode Z12. The saturation of the iron core of transformer T1 acts to shorten the duty cycle of the voltage V and thus shorten the time which Zener diode Z12 clamps during a half cycle. This lessnes the power dissipation of Zener diode Z12. It can be seen from the foregoing description and operating characteristics that the inner action of the recloser control circuit power supply, the fault sensing current transformers and the potential transformer and their interconnection with respect to each other provides two valuable circuit requirements for the recloser control namely, overvoltage protection and low voltage protection.

It is to be understood that the integrated circuits shown in the accompanying drawings may be replaced by suitable static discrete circuitry which accomplishes the stated purpose of the integrated circuit. It is also to be understood that some of the elements described are not necessary for complete circuit operation. As an example, the coldload protection. Further, the absence of the ONE SHOT TO LOCKOUT switch does not effect the operation of the circuit appreciably. It is also to be understood that the current transformers may be connected as shown in the figures or may be connected in any other convenient manner for providing signal information and energy to the circuit for operation thereof. It is also to be understood that the circuit works equally well on polyphase and single phase lines and works equally well for circuits including returned or neutral lines as part of the transmission system being monitored or protected. It is also to be understood that the choice of the number of positions of each of the selector switches is not limiting except as has been previously described. It is also to be understood that the programmable time delay for the various circuit operations may be different from those depicted in the figures except as otherwise stated herein. It is also to be understood that all of the circuitry except the transformers, the auxiliary contacts of the circuit breaker, the closing motor, the trip coil and the selector switches may be incorporated into one single large integrated circuit. It is also to be understood that the choice of power supply voltages is not limiting. It is also to be understood that the choice of NAND circuit logic is not limiting and other circuit logic arrangements including NOR AND or NOT may be used provided they meet the standards of the criteria for operation set out previously. It is also to be understood that light emitting diodes may be used in place of some indicating lamps.

The apparatus embodying the teachings of this invention has several advantages. For example, the entire circuitry within the control system with the exception of the auxiliary contacts of the circuit interrupter or circuit breaker is static. The circuitry is less acceptable to environmental interferences such as caused by the presence of gases and dirt in the atmosphere surrounding the circuit and because the fast operation characteritics of circuitry may be thought of as acting at relatively high speeds when compared with the mechanical counterparts thereof. Other advantages lies in the fact that the circuitry of the control system is sufficiently compact to be placed in a single control unit for convenient mounting where desired for controlling the circuit recloser.

What I claim as my invention is:
1. An electric circuit recloser, comprising
separable main contacts for interconnecting an electrical circuit connected thereto;
means for opening and closing said separable main contacts in response to a stimulus;
a control for providing said stimulus;
a power supply for empowering said control, said power supply having a regulating means therein to regulate the output voltage of said power supply;
a sensor for monitoring said electrical circuit to thereby provide information about the fault status of said electrical circuit to said control; and
a transformer having a primary winding, a secondary winding, and auxiliary winding, and a potential developing resistor connected across said primary winding, said primary winding being connected to said sensor, said secondary winding being connected to said control, said auxiliary winding being connected to said power supply, said auxiliary winding interacting with said regulating means of said power supply to generally fix the maximum value of voltage which may appear across said secondary winding regardless of the fault status of said electrical circuit by electromagnetically controlling the amount of electrical current flowing in said primary winding to keep the amount of current flowing in said potential developing resistor constant regardless of the amount of said fault current after a predetermined maximum secondary voltage appears on said secondary winding.

2. An electric circuit recloser, comprising:

separable main contacts for interconnecting an electrical circuit connected thereto;

means for opening and closing said separable main contacts in response to a stimulus;

a control for providing said stimulus;

a power supply for empowering said control, said power supply having regulating means therein to regulate the output voltage of said power supply;

a sensor for monitoring said electrical circuit to provide information about the fault status of said electrical circuit to said control; and a transformer having a primary winding, a secondary winding, and an auxiliary winding, and a potential developing resistor connected across said primary winding, said primary winding being connected to said sensor, said secondary winding being connected to said control, said auxiliary winding interacting with said power supply to provide a voltage source therefore if the main source of power for said power supply fails to provide sufficient voltage to said power supply to energize said power supply.

3. An electric circuit recloser, comprising separable main contacts for interconnecting an electrical circuit connected thereto;

means for opening and closing said separable main contacts in response to a stimulus;

a control for providing said stimulus;

a power supply for empowering said control, said power supply having a regulating means therein to regulate the output voltage of said power supply;

a sensor for monitoring said electrical circuit to thereby provide information about the fault status of said electrical circuit to said control; and a transformer having a primary winding, a secondary winding, and auxiliary winding, and a potential developing resistor connected across said primary winding, said primary winding being connected to said sensor, said secondary winding being connected to said control, said auxiliary winding interacting with said power supply to provide a voltage source therefore if the main source of power for said power supply fails to provide sufficient voltage to said power supply to energize said power supply, said auxiliary winding also interacting with said regulating means of said power supply to generally fix the maximum value of voltage which may appear across said secondary winding regardless of the fault status of said electrical circuit by electromagnetically controlling the amount of electrical current flowing in said primary winding to keep the amount of current flowing in said potential developing resistor constant regardless of the amount of said fault current after a predetermined maximum secondary voltage appears on said secondary winding.

* * * * *